United States Patent
Tajima et al.

(10) Patent No.: US 12,374,761 B2
(45) Date of Patent: Jul. 29, 2025

(54) BATTERY MODULE, METHOD FOR MANUFACTURING BATTERY MODULE, AND ELECTRONIC DEVICE

(71) Applicant: Semiconductor Energy Laboratory Co., Ltd., Atsugi (JP)

(72) Inventors: Ryota Tajima, Isehara (JP); Kazuhei Narita, Atsugi (JP); Kensuke Yoshizumi, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/116,907

(22) Filed: Mar. 3, 2023

(65) Prior Publication Data

US 2023/0207976 A1 Jun. 29, 2023

Related U.S. Application Data

(63) Continuation of application No. 17/179,979, filed on Feb. 19, 2021, now Pat. No. 11,600,883, which is a
(Continued)

(30) Foreign Application Priority Data

Apr. 13, 2016 (JP) .................... 2016-080389

(51) Int. Cl.
*H01M 50/531* (2021.01)
*H01M 50/116* (2021.01)
(Continued)

(52) U.S. Cl.
CPC ....... *H01M 50/531* (2021.01); *H01M 50/116* (2021.01); *H01M 50/178* (2021.01);
(Continued)

(58) Field of Classification Search
CPC ............. H01M 50/40–497; H01M 50/50–503; H01M 50/528–54; H01M 50/543–567
See application file for complete search history.

(56) References Cited

U.S. PATENT DOCUMENTS 5,889,737 A 3/1999 Alameh et al.
7,846,580 B2 12/2010 Oh
(Continued)

FOREIGN PATENT DOCUMENTS

CN 001412866 A 4/2003
CN 001753237 A 3/2006
(Continued)

OTHER PUBLICATIONS

International Search Report (Application No. PCT/IB2017/051839) Dated Jul. 4, 2017.
(Continued)

*Primary Examiner* — Jonathan Crepeau
*Assistant Examiner* — Jacob Buchanan
(74) *Attorney, Agent, or Firm* — Robinson Intellectual Property Law Office, P.C.; Eric J. Robinson

(57) ABSTRACT

A battery module with high impact resistance is provided. A battery module using an elastic body such as rubber for its exterior body covering a battery is provided. A bendable battery module is provided. As the exterior body covering a battery, an elastic body such as rubber is used, and the exterior body is molded in two steps. First, a first portion provided with a depression in which a battery is stored is molded using a first mold. Next, a battery is inserted into the first portion. Subsequently, second molding is performed using a second mold so as to fill an opening of the depression in the first portion, so that a second portion is formed. The second portion serves as a cover for closing the opening of the depression in the first portion. The second portion is
(Continued)

formed in contact with part of the electrodes in the battery and part of an end portion of the second exterior body in the battery.

20 Claims, 20 Drawing Sheets

Related U.S. Application Data continuation of application No. 15/471,261, filed on Mar. 28, 2017, now Pat. No. 10,930,904.

(51) Int. Cl.
| | |
|---|---|
| H01M 50/178 | (2021.01) |
| H01M 50/209 | (2021.01) |
| H01M 50/244 | (2021.01) |
| H01M 50/247 | (2021.01) |
| H01M 50/50 | (2021.01) |
| H01M 50/543 | (2021.01) |
| H01M 50/548 | (2021.01) |
| H01M 50/55 | (2021.01) |

(52) U.S. Cl.
CPC ....... *H01M 50/209* (2021.01); *H01M 50/244* (2021.01); *H01M 50/247* (2021.01); *H01M 50/50* (2021.01); *H01M 50/543* (2021.01); *H01M 50/548* (2021.01); *H01M 50/55* (2021.01); *H01M 2220/30* (2013.01); *Y02E 60/10* (2013.01)

(56) References Cited

U.S. PATENT DOCUMENTS

| | | | |
|---|---|---|---|
| 8,043,742 B2 | 10/2011 | Yeo | |
| 9,412,981 B2 | 8/2016 | Nakayama | |
| 9,594,402 B2 | 3/2017 | Hiroki et al. | |
| 9,713,271 B2 | 7/2017 | Hiroki et al. | |
| 10,320,025 B2 | 6/2019 | Hiroki et al. | |
| 10,930,904 B2 | 2/2021 | Tajima et al. | |
| 11,013,132 B2 | 5/2021 | Hiroki et al. | |
| 11,316,189 B2 | 4/2022 | Hiroki et al. | |
| 11,317,525 B2 | 4/2022 | Hiroki et al. | |
| 11,600,883 B2* | 3/2023 | Tajima | H01M 50/548 |
| 11,672,086 B2 | 6/2023 | Hiroki et al. | |
| 2003/0072994 A1 | 4/2003 | Goushu et al. | |
| 2004/0033416 A1 | 2/2004 | Kim et al. | |
| 2005/0042511 A1 | 2/2005 | Kaneta | |
| 2005/0189906 A1 | 9/2005 | Sun | |
| 2005/0191546 A1* | 9/2005 | Jeon | H01M 50/296 |
| | | | 429/185 |
| 2006/0099503 A1 | 5/2006 | Lee | |
| 2006/0257731 A1* | 11/2006 | Yoon | H01M 50/553 |
| | | | 429/176 |
| 2013/0110264 A1* | 5/2013 | Weast | H04B 1/385 |
| | | | 700/91 |
| 2013/0252065 A1 | 9/2013 | Ueda | |
| 2014/0127551 A1 | 5/2014 | Kim | |
| 2015/0022957 A1 | 1/2015 | Hiroki et al. | |
| 2015/0077912 A1 | 3/2015 | Ishibashi | |
| 2015/0086858 A1* | 3/2015 | Seong | H01M 50/133 |
| | | | 29/623.2 |
| 2015/0092360 A1* | 4/2015 | Stillman | H01M 50/24 |
| | | | 361/749 |
| 2015/0125724 A1 | 5/2015 | Nakayama | |
| 2015/0171380 A1 | 6/2015 | Seong | |
| 2016/0073519 A1 | 3/2016 | Hiroki | |
| 2016/0109852 A1 | 4/2016 | Kuwabara et al. | |
| 2016/0157372 A1 | 6/2016 | Hiroki | |
| 2017/0347471 A1 | 11/2017 | Hiroki et al. | |
| 2022/0109178 A1 | 4/2022 | Hiroki et al. | |
| 2023/0328905 A1 | 10/2023 | Hiroki et al. | |

FOREIGN PATENT DOCUMENTS

| | | |
|---|---|---|
| CN | 101604761 A | 12/2009 |
| CN | 103515645 A | 1/2014 |
| CN | 104619138 A | 5/2015 |
| CN | 105393395 A | 3/2016 |
| EP | 2133933 A | 12/2009 |
| EP | 2677563 A | 12/2013 |
| EP | 3367494 A | 8/2018 |
| JP | 11-111250 A | 4/1999 |
| JP | 2001-052762 A | 2/2001 |
| JP | 2001-057191 A | 2/2001 |
| JP | 2002-151032 A | 5/2002 |
| JP | 2008-300245 A | 12/2008 |
| JP | 2012-248417 A | 12/2012 |
| JP | 2014-003019 A | 1/2014 |
| JP | 2015-038868 A | 2/2015 |
| JP | 2015-090272 A | 5/2015 |
| JP | 2016-027532 A | 2/2016 |
| JP | 2017-195179 A | 10/2017 |
| JP | 2018-142540 A | 9/2018 |
| KR | 2003-0096718 A | 12/2003 |
| KR | 2013-0142898 A | 12/2013 |
| KR | 2016-0033080 A | 3/2016 |
| TW | 201432985 | 8/2014 |
| WO | WO-2015/008716 | 1/2015 |
| WO | WO-2017/178916 | 10/2017 |

OTHER PUBLICATIONS

Written Opinion (Application No. PCT/IB2017/051839) Dated Jul. 4, 2017.

Chinese Office Action (Application No. 201780023092.7) Dated Mar. 31, 2021.

Chinese Office Action (Application No. 201780023092.7) Dated Apr. 20, 2022.

* cited by examiner

FIG. 6A1
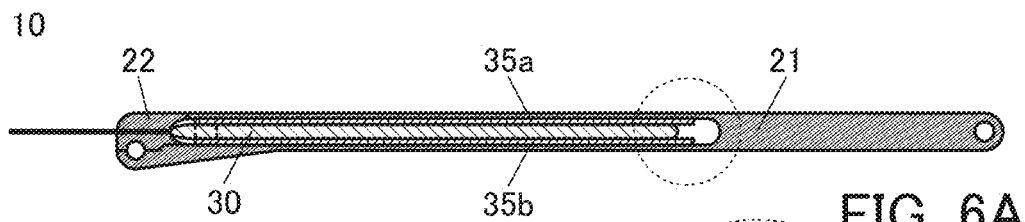
FIG. 6A2
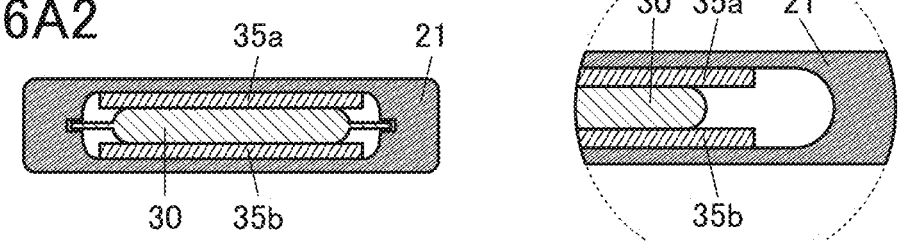
FIG. 6A3
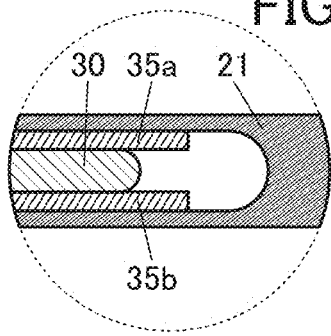
FIG. 6B1
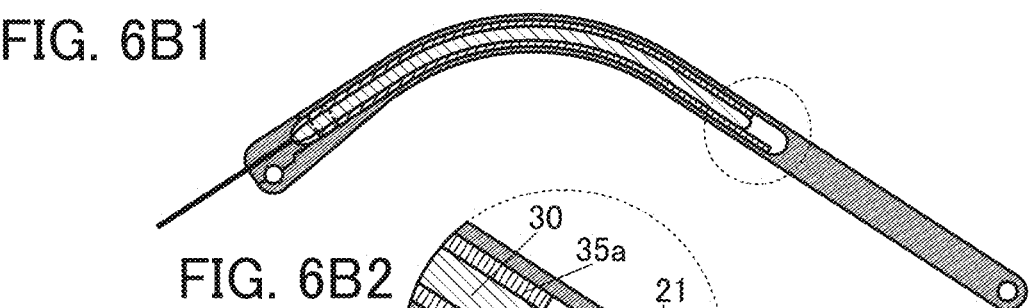
FIG. 6B2
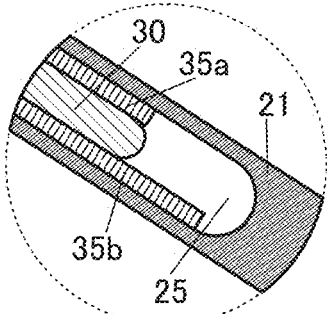
FIG. 6C1
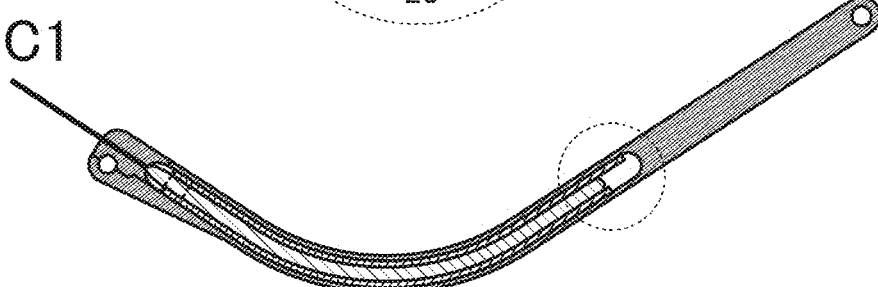
FIG. 6C2
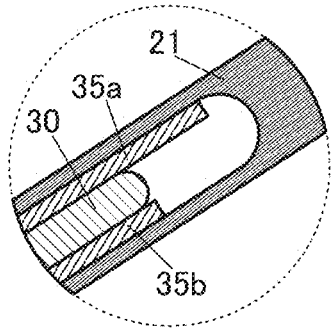

FIG. 7A1
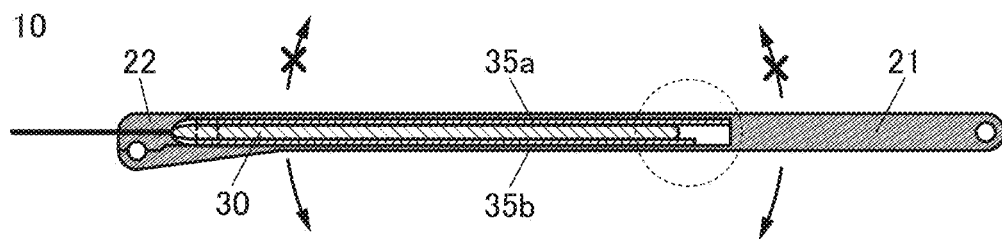
FIG. 7A2
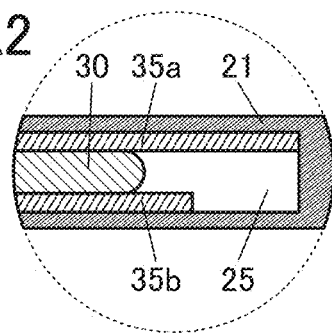
FIG. 7B1
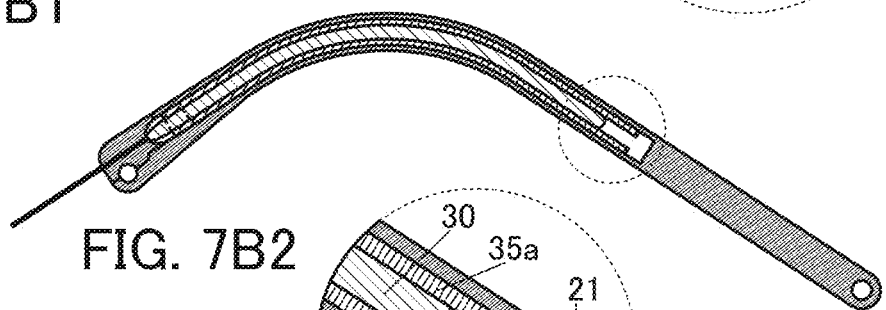
FIG. 7B2
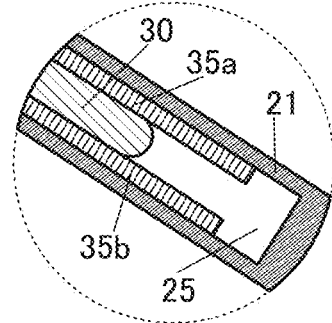
FIG. 7C1
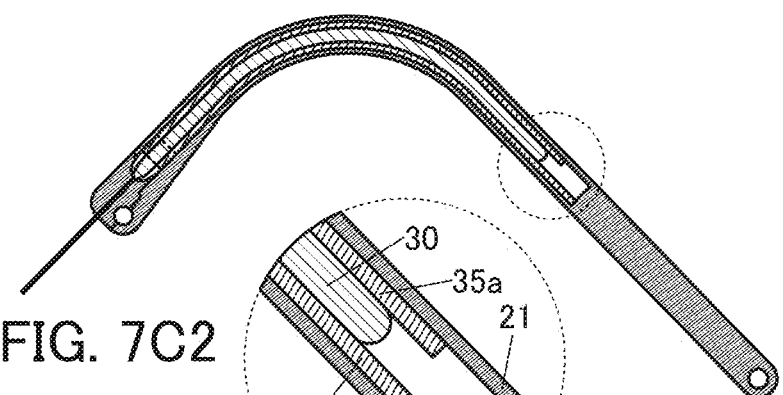
FIG. 7C2
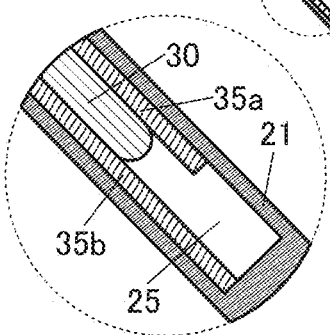

FIG. 8A1
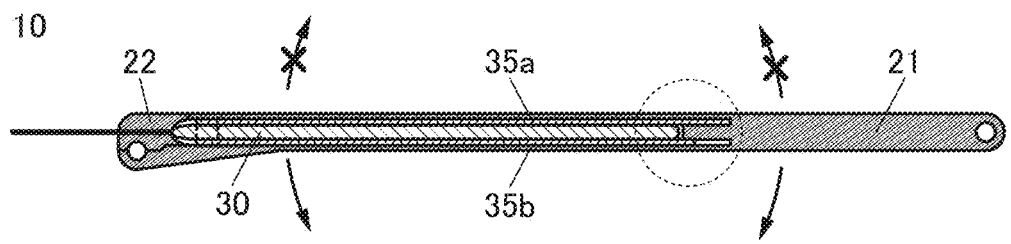
FIG. 8A2
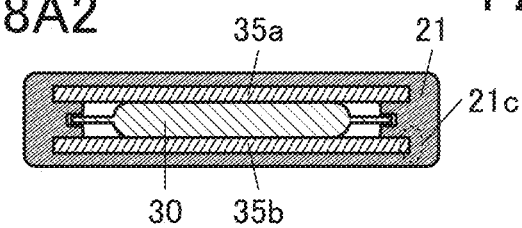
FIG. 8A3
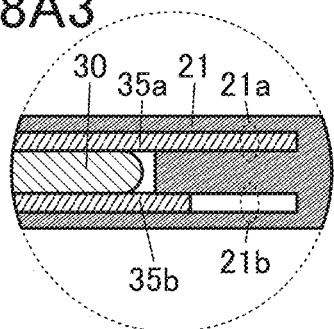
FIG. 8B1
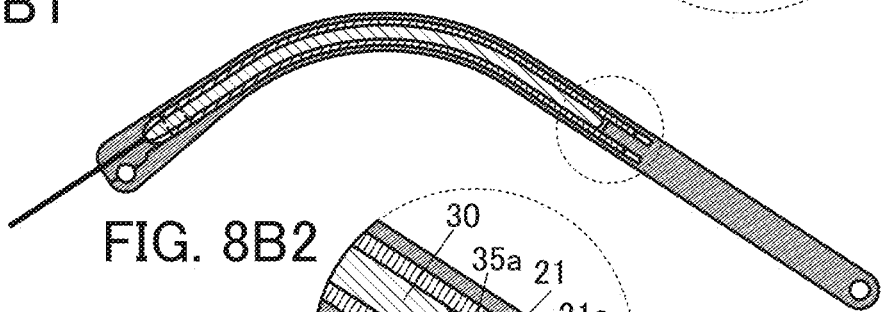
FIG. 8B2
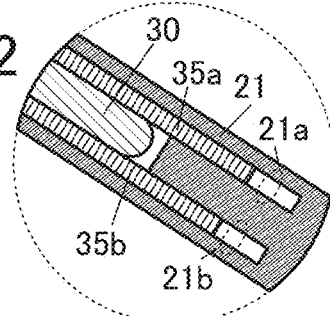
FIG. 8C1
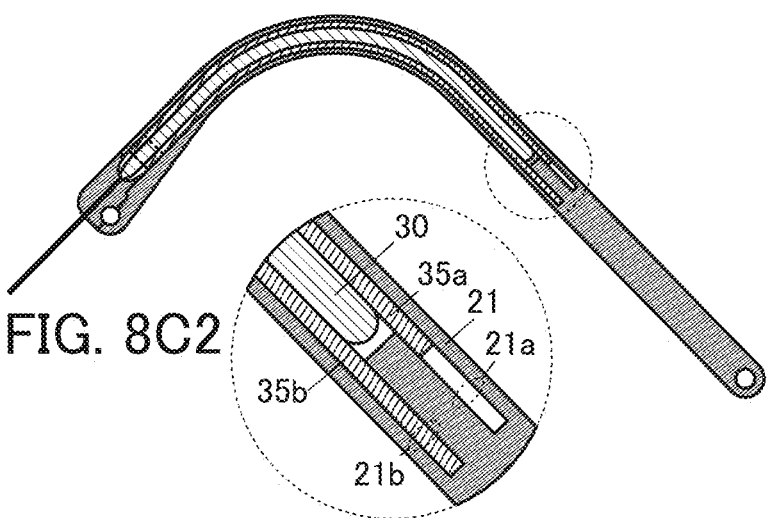
FIG. 8C2
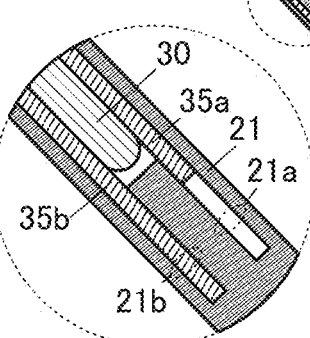

BATTERY MODULE, METHOD FOR MANUFACTURING BATTERY MODULE, AND ELECTRONIC DEVICE

TECHNICAL FIELD

One embodiment of the present invention relates to a battery. One embodiment of the present invention relates to a battery module including a battery. One embodiment of the present invention relates to a battery that is attachable to an electronic device. One embodiment of the present invention relates to an electronic device that is driven by a battery.

Note that one embodiment of the present invention is not limited to the above technical field. Examples of the technical field of one embodiment of the present invention disclosed in this specification include a semiconductor device, a display device, a light-emitting device, a power storage device, a memory device, an electronic device, a lighting device, an input device, an input/output device, a driving method thereof, and a manufacturing method thereof.

BACKGROUND ART

Portable information terminal devices typified by smartphones and tablet terminals have been actively developed. Such electronic devices are required to be lightweight and compact, for example.

In recent years, wearable electronic devices (also referred to as wearable devices) especially have been under active development. Examples of wearable devices include a watch-type device worn on an arm, a glasses-like or a goggle-type device worn on a head, and a necklace-type device worn on a neck. For example, a watch-type device includes a small-sized display instead of a conventional watch dial to provide the user with various information in addition to the time. Such wearable devices have attracted attention to the medical use, the use for self-health management, or the like and have been increasingly put into practical use.

Mobile devices include secondary batteries that are capable of being repeatedly charged and discharged, in many cases. Wearable devices particularly include small-sized secondary batteries; thus, secondary batteries should be lightweight and compact and should be capable of being used for a long time.

For example, Patent Document 1 discloses a wearable device including a flexible secondary battery in which a film is used as its exterior body.

REFERENCE

Patent Document

[Patent Document 1] Japanese Published Patent Application No. 2015-038868

DISCLOSURE OF INVENTION

A second battery might cause heat generation or catch fire when its exterior body is damaged, and thus the second battery is generally covered with a hard exterior body even in the case where a film is used for the exterior body. However, this structure has a problem in that change in shape of the second battery due to bending or the like is not assumed and the place where the secondary battery is provided is limited in the case of being mounted on an electronic device.

An object of one embodiment of the present invention is to provide a battery module which has high impact resistance and can be mounted on or connected to an electronic device.

Another object of one embodiment of the present invention is to provide a battery module using an elastic body such as rubber for its exterior body covering a battery. Another object of one embodiment of the present invention is to provide a bendable battery module.

Another object of one embodiment of the present invention is to provide a battery module which can be used as a wearing tool for an electronic device. Another object of one embodiment of the present invention is to provide a battery module which can be used as a bendable wearing tool.

Another object of one embodiment of the present invention is to provide a battery module in which a problem such as damage to a battery due to too much bending is suppressed. Another object of one embodiment of the present invention is to provide a battery module in which the range of bending is limited.

Another object of one embodiment of the present invention is to achieve an electronic device which is capable of being used for a long time. Another object of one embodiment of the present invention is to provide an electronic device, a battery module, or the like having a high design property. Another object of one embodiment of the present invention is to provide a battery module which can be easily attached to and detached from an electronic device. Another object of one embodiment of the present invention is to provide an electronic device or a battery module having high water resistance. Another object of one embodiment of the present invention is to provide a novel battery module or a novel electronic device.

Another object of one embodiment of the present invention is to provide an electronic component having high impact resistance or a module including the electronic component.

One embodiment of the present invention is a battery module including a first exterior body and a battery. The battery includes a second exterior body, a positive electrode, a negative electrode, an electrolyte, and a pair of tabs. The positive electrode, the negative electrode, and the electrolyte are positioned in the second exterior body. The pair of tabs are provided so as to project outside the second exterior body. The first exterior body includes an elastic material. The first exterior body includes a first portion, a second portion, and a space surrounded by the first portion and the second portion. The second exterior body is provided in the space. The first portion and the second portion are bonded to each other. The second portion is in contact with part of the tabs and an end portion of the second exterior body.

In the above, it is preferable that the first portion and the second portion include the same material and that the first portion and the second portion be bonded directly to each other. In the above, it is preferable that the volume or the surface area of the second portion be smaller than that of the first portion.

In the above, it is preferable that the second exterior body have a film-like shape and that the second exterior body change its shape along the first exterior body when the first exterior body changes its shape.

In the above, it is preferable that the first exterior body include a protection member. The protection member preferably include a third portion covering one of two surfaces of the second exterior body, which are opposite to each other, and a fourth portion covering the other. It is preferable that the third portion and the fourth portion each have a plate-like shape and change its shape along the first exterior body.

It is preferable that the third portion and the fourth portion of the protection member be bonded to each other on the second portion side of the first exterior body.

It is preferable that the third portion and the fourth portion of the protection member have different lengths.

In the above, it is preferable that the first portion of the first exterior body include slits into which the third portion and the fourth portion of the protection member fit slidably.

In the above, it is preferable that the first exterior body have a belt-like shape and a region with a thickness less than or equal to 5 mm.

In the above, it is preferable that the battery module include a circuit board. The circuit board preferably includes terminals electrically connected to the tabs. The second portion of the first exterior body is preferably provided so as to cover the tabs and at least part of the circuit board.

The circuit board preferably includes a protection circuit.

In the above, it is preferable that the battery module include a frame. The frame preferably includes a material having higher rigidity than the exterior body. The frame preferably includes a first terminal and a second terminal. The first terminal is a terminal electrically connected to the tab, and the second terminal is a terminal electrically connected to the first terminal. The first portion of the first exterior body is preferably provided so as to cover part of the frame and part of the first terminal. It is preferable that at least part of the second terminal be exposed.

Another embodiment of the present invention is an electronic device including a housing. The housing preferably has a shape to be fitted into the frame and includes a third terminal electrically connected to the second terminal when the housing fits into the frame.

Another embodiment of the present invention is a method for manufacturing a battery module including a battery and a first exterior body covering the battery, which includes a first step, a second step, a third step, and a fourth step. The first step is a step of preparing a battery including a second exterior body and a pair of electrodes. The second step is a step of forming a first portion including a depression by molding a first material using a first mold. The third step is a step of inserting the battery into the depression from the opening edge side so that part of the electrodes projects outside the opening edge of the depression. The fourth step is a step of forming the first exterior body in which the first portion and the second portion are bonded to each other in such a manner that the second portion which seals the opening edge of the depression is formed by providing the first portion into which the battery is inserted in a second mold and molding a second material using the second mold. Here, the second portion is formed so that it is in contact with the end portion of the second exterior body and part of the electrodes is exposed at the outside of the second portion.

In the above manufacturing method, the electrodes are each preferably any of the tab projecting from the second exterior body and a terminal electrically connected to the tab.

In the above manufacturing method, the first material is preferably the same as the second material.

In the above manufacturing method, it is preferable that a millable material be used as the first material and the second material and that the first portion and the second portion be formed by direct pressure molding, direct pressure injection molding, or injection molding.

It is preferable that a liquid material or a paste-form material be used as the first material and the second material and that the first portion and the second portion be formed by injection molding.

According to one embodiment of the present invention, a battery module which has high impact resistance and can be mounted on or connected to an electronic device can be provided.

According to one embodiment of the present invention, a battery module using an elastic body such as rubber for its exterior body covering a battery can be provided. According to one embodiment of the present invention, a bendable battery module can be provided.

According to one embodiment of the present invention, a battery module which can be used as a wearing tool for an electronic device can be provided. According to one embodiment of the present invention, a battery module which can be used as a bendable wearing tool can be provided.

According to one embodiment of the present invention, a battery module in which a problem such as damage to a battery due to too much bending is suppressed can be provided. According to one embodiment of the present invention, a battery module in which the range of bending is limited can be provided.

According to one embodiment of the present invention, an electronic device which is capable of being used for a long time can be achieved. According to one embodiment of the present invention, an electronic device, a battery module, or the like having a high design property can be provided. According to one embodiment of the present invention, a battery module which can be easily attached to and detached from an electronic device can be provided. According to one embodiment of the present invention, an electronic device or a battery module having high water resistance can be provided. According to one embodiment of the present invention, a novel battery module or a novel electronic device can be provided.

According to one embodiment of the present invention, an electronic component having high impact resistance or a module including the electronic component can be provided.

BRIEF DESCRIPTION OF DRAWINGS

FIGS. 6A1 to 6A3, 6B1, 6B2, 6C1, and 6C2 illustrate a structure example of a battery module of an embodiment.

FIGS. 7A1, 7A2, 7B1, 7B2, 7C1, and 7C2 illustrate a structure example of a battery module of an embodiment.

FIGS. 8A1 to 8A3, 8B1, 8B2, 8C1, and 8C2 illustrate a structure example of a battery module of an embodiment.

BEST MODE FOR CARRYING OUT THE INVENTION

Figure 1A:
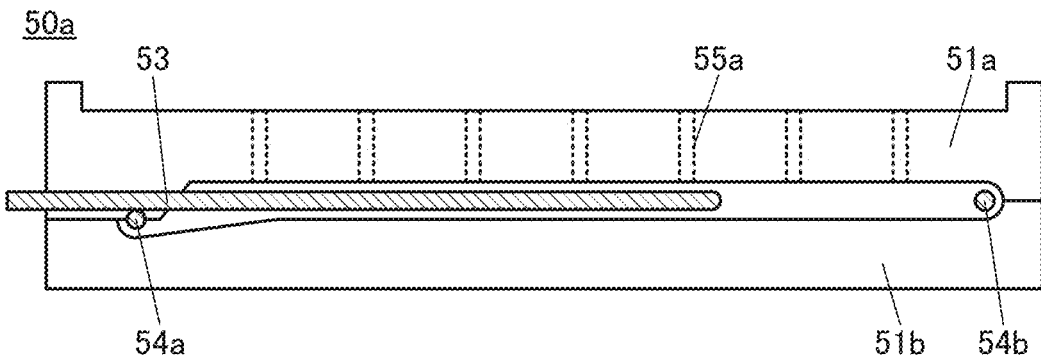
FIGS. 1A to 1E illustrate a structure example of a battery module of an embodiment and a method for manufacturing the battery module of an embodiment.

Embodiments will be described in detail with reference to the drawings. Note that one embodiment of the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments and example.

Note that in structures of the present invention described below, the same portions or portions having similar functions are denoted by the same reference numerals in different drawings, and a description thereof is not repeated. Furthermore, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

Embodiment 1

One embodiment of the present invention is a battery module including a battery and a first exterior body covering the battery.

The battery includes a positive electrode, a negative electrode, an electrolyte, and a second exterior body covering them. Furthermore, the battery includes a pair of tabs. The pair of tabs are electrically connected to the positive electrode and the negative electrode and project outside the second exterior body. The positive electrode and the negative electrode each include a current collector and an active material. The battery may include a separator which prevents an electrical short-circuit between the positive electrode and the negative electrode. The electrolyte may be an electrolyte solution or a solid electrolyte.

When a film-like material is used for the second exterior body, the battery can have flexibility.

The first exterior body is provided to cover the battery and has a function of protecting the battery. When an elastic body such as rubber or an elastic resin is used as the first exterior body, the impact resistance of the battery module can be improved.

The first exterior body may have a shape capable of being used for a wearing tool for a wearable device. Typically, the first exterior body may have a shape of a band (also referred to as a belt or a strap) of a watch-type device. Thus, the battery module can be used as a power supply (a main power supply or an auxiliary power supply) for the wearable device.

Here, in the case where rubber or an elastic resin is molded into an arbitrary shape using a metallic mold or the like, a high pressure needs to be applied to the material. When rubber or the like is molded in a state where a structure is provided in the metallic mold, a high pressure is isotropically applied to the structure. Therefore, in the case where the first exterior body is molded in a state where the battery is provided in the metallic mold, the battery changes its shape and is damaged due to the pressure in some cases. Accordingly, it is difficult to mold rubber or the like as the first exterior body covering a battery particularly when the battery includes a film for the second exterior body.

Furthermore, when rubber or the like is molded, a high temperature is needed in order to soften the material, and in order to cause a cross-linking reaction of the material or thermally cure the material. When the battery is provided in the metallic mold at this time, the battery may deteriorate due to the heat. Accordingly, not only in the case of the battery using a film for the second exterior body but also in the case of a battery using a material having relatively high rigidity in the second exterior body, it is difficult to mold rubber or the like so as to cover the battery.

In view of the above, in one embodiment of the present invention, the first exterior body is molded in two steps (by first molding and second molding). First, a first portion provided with a depression for storing the battery is molded using a first mold (the first molding). The shape of the first portion can be referred to as a bag-like shape having a pocket for storing the battery, and an opening of the depression (the pocket) is formed. The size of the opening of the depression can be determined in consideration of the width and the height of the battery and is preferably as small as possible.

When the pocket (the depression) is formed in the first portion in advance and the shape of the opening and the shape of the pocket are formed in accordance with the shape of the battery, the battery can be provided in a predetermined position in inserting the battery, and thus misalignment between the first exterior body to be formed and the battery can be prevented. Given that the battery is bent in one direction, for example, it is particularly important to control the positions of the first exterior body and the battery precisely.

Next, the battery is inserted into the first portion. At this time, the battery is inserted so that part of the electrodes (the tabs, or electrodes of a circuit board or the like, to which the tabs are connected) of the battery is positioned outward from the opening edge of the depression in the first portion.

Subsequently, second molding is performed using a second mold so as to fill the opening of the depression in the first portion, so that a second portion is formed. The second portion serves as a cover for closing the opening of the depression in the first portion. The second portion is formed in contact with part of the electrodes in the battery and part of an end portion of the second exterior body of the battery. It is preferable to form the second portion in the second molding so as to avoid the position where the positive electrode and the negative electrode of the battery are provided. Thus, in molding the second portion, a pressure can be prevented from being applied to a main portion of the battery, and thus the battery can be prevented from changing its shape or being damaged. The second portion is preferably formed in contact with a sealing portion of the battery on the tab side (also referred to as a top sealing portion) and the vicinity thereof in the case where a film is used for the second exterior body of the battery.

In the case where a high temperature is needed in molding rubber or the like, the first exterior body is molded in two steps as described above, in which case the battery is exposed to a high temperature only in one of the two steps. Accordingly, the battery can be prevented from deteriorating in molding the first exterior body.

Thus, the first exterior body in which a space is formed can be molded. In the first exterior body, the first portion and the second portion are bonded directly to each other. A boundary (a parting line) is formed between the first portion and the second portion in some cases.

In the battery module formed in this manner, the battery and the first exterior body are fixed by the second portion. That is, the battery is sealed in the first exterior body in a state where part of the battery in contact with the second portion is fixed and the other part is not fixed. Since the battery is not fixed to the first portion, when the first portion changes its shape, for example, is bent, the battery and the exterior body can change their shapes independently from each other. In the case where the battery is bonded to the first portion, for example, stress is applied to the battery due to change in the shape of the first portion. In contrast, since the battery is not bonded to the first portion of the first exterior body in the battery module of one embodiment of the present invention, the first exterior body can change its shape by weaker force.

The battery module of one embodiment of the present invention and a method for manufacturing the battery module are described below more specifically.

Structure Example 1

Here, an example of a band-like battery module which is suitable for a watch-type electronic device is described. Note that it is needless to say that battery modules having a variety of shapes can be manufactured by a method described below depending on the shape of a mold.

Figure 1B:
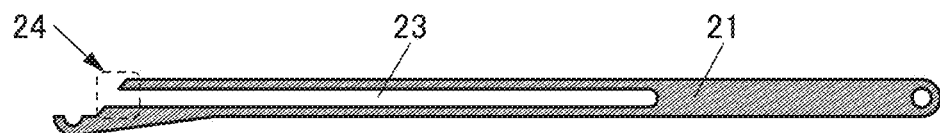
Figure 1C:
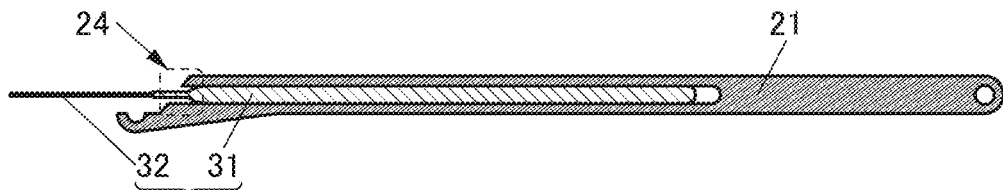
Figure 1D:
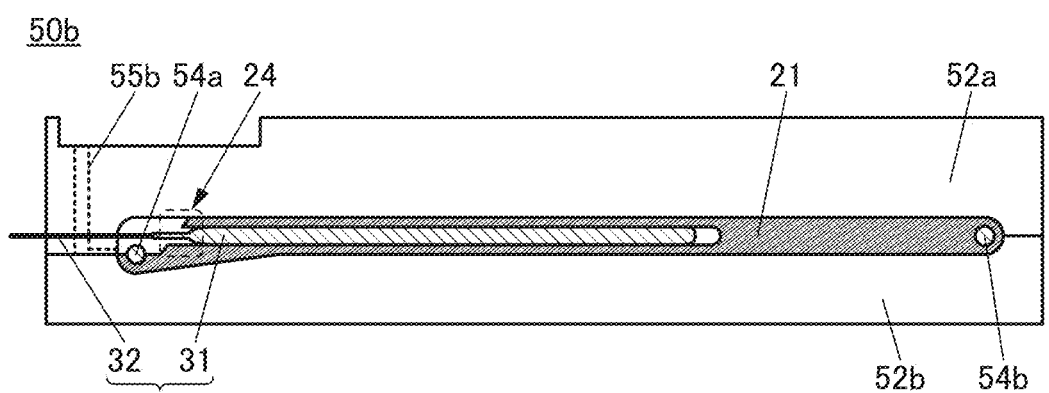
Figure 1E:
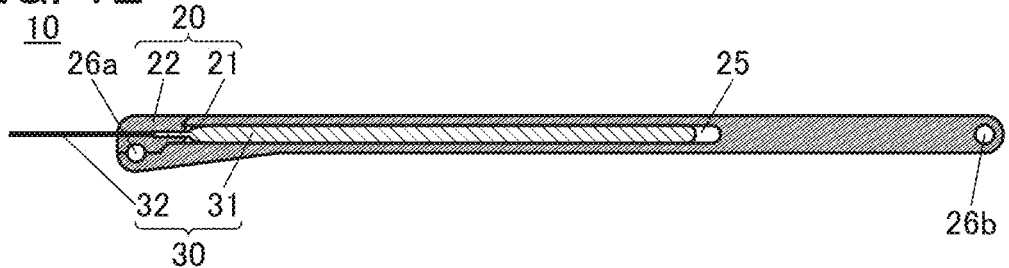

FIG. 1A is a schematic cross-sectional view of a mold 50a for molding a first portion 21 of an exterior body 20 in a battery module 10 illustrated in FIG. 1E. The mold 50a includes an upper mold 51a, a lower mold 51b, a core 53, a core 54a, a core 54b, and the like. In the upper mold 51a, an injection hole 55a for injecting a material is provided. Note that, in addition to the injection hole 55a, a vent hole is actually provided in the upper mold 51a or the lower mold 51b. The vent hole is not always provided.

The core 53 is a member for forming the depression in the molded first portion 21. The core 54a and the core 54b are each a member for forming a through hole in the molded first portion 21. These cores are each also referred to as a core cylinder or the like in some cases.

A material is molded using the mold 50a illustrated in FIG. 1A, so that the first portion 21 illustrated in FIG. 1B can be formed.

As a method for molding the first portion 21, a molding method using a solid material or a semisolid material (collectively also referred to as a millable material) or a molding method using a liquid material (including a paste material) can be used. As a molding method using a millable material, direct pressure molding (also referred to as compression molding), direct pressure injection molding (also referred to as transfer molding), injection molding, or the like can be given. As a molding method using a liquid material, injection molding can be given and is also referred to as a liquid injection molding (LIM) method in some cases.

The mold 50a illustrated in FIG. 1A is suitable for direct pressure injection molding. A material is provided over the upper mold 51a, and a mold for pressing is pressed from thereover, whereby the material can be injected from the injection hole 55a. Note that the position or the external shape of the injection hole in the mold 50a may be changed as appropriate depending on a molding method.

As a material to be molded, an elastic material can be favorably used. When the battery 30 described later is surrounded by an elastic body, the battery module 10 can have high impact resistance (see FIG. 1E). Furthermore, the battery module 10 capable of being wound around an arm or the like can be obtained when a bendable battery is used as the battery 30.

As a rubber material, a thermosetting material can be favorably used. When a thermosetting rubber material is used, a product which has high heat resistance and can be used in a wide temperature range can be provided. In addition, when a rubber material is used, high chemical resistance or high weather resistance can be achieved.

As a rubber material, typically, a material such as silicone rubber or fluorine rubber can be used. Silicone rubber or fluorine rubber can be molded easily and favorably used for a product touching a human body.

As other rubber materials, materials such as natural rubber, styrene-butadiene rubber, isoprene rubber, butadiene rubber, chloroprene rubber, acrylonitrile-butadiene rubber, butyl rubber, urethane rubber, ethylene-propylene rubber, and ethylene-propylene-diene rubber can be used.

As a resin material, a thermoplastic elastomer having rubber elasticity at room temperature can be favorably used. When a thermoplastic elastomer is used, the number of steps for molding can be reduced as compared with the case of using rubber which needs vulcanization. For example, a styrene-based elastomer, an olefin-based elastomer, an ester-based elastomer, an amide-based elastomer, PVC (polyvinyl chloride)-based elastomer, a urethane-based elastomer, a fluorine-based elastomer, or the like can be used.

Figure 2A:
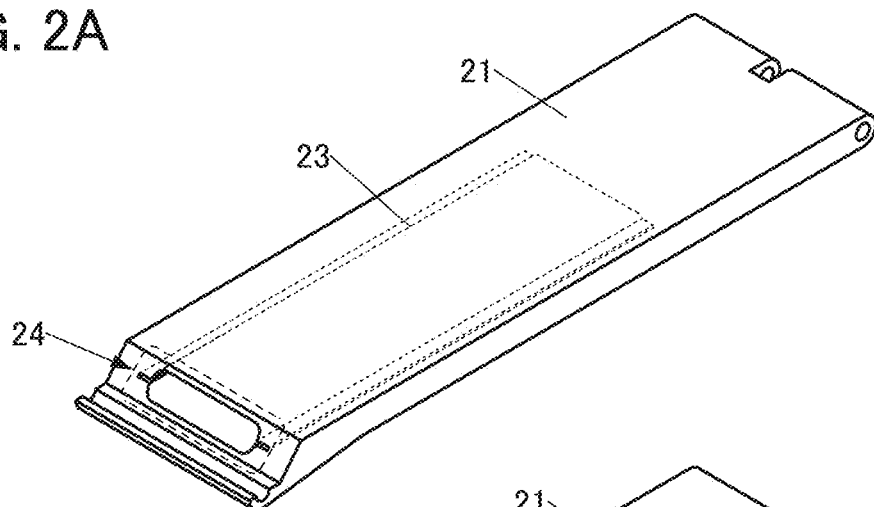
FIGS. 2A to 2C illustrate a structure example of a battery module of an embodiment and a method for manufacturing the battery module of an embodiment.

FIG. 1B is a schematic cross-sectional view of the first portion 21 formed in the above manner, and FIG. 2A is a schematic perspective view thereof. The first portion 21 has a belt-like shape. In the first portion 21, a depression 23 having an opening edge 24 is formed on the short side. The shape of the depression 23 is designed so that the battery 30 described later fits into the depression 23.

The first portion 21 is formed using the mold 50a illustrated in FIG. 1A and has a shape in which the vicinity of the opening edge 24 is cut out obliquely as illustrated in FIG. 1B and FIG. 2A. Thus, the area of the opening edge 24 can be made large, so that the battery 30 is inserted easily as described below. In addition, the area where the second portion 22 of the exterior body 20 in the battery module 10 described later and the first portion 21 are bonded to each other is increased, so that the bonding strength can be enhanced (FIG. 1E and FIG. 2C).

Figure 2B:
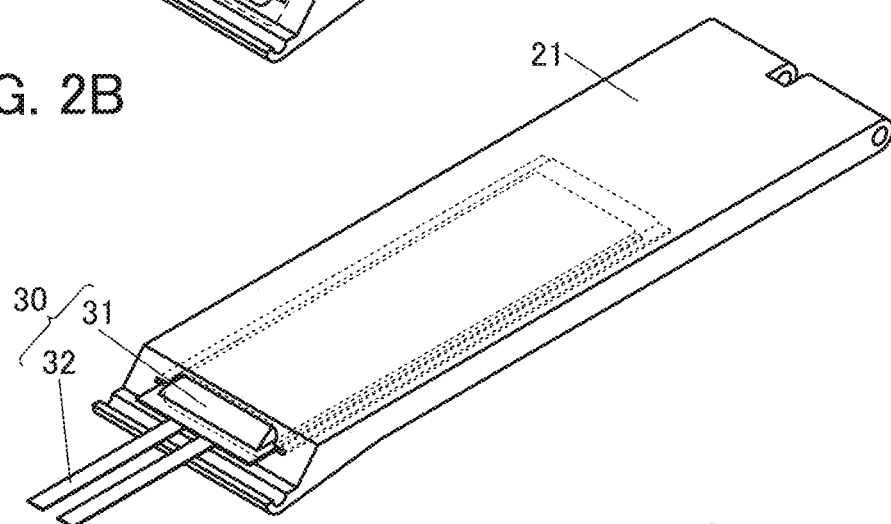
Figure 2C:
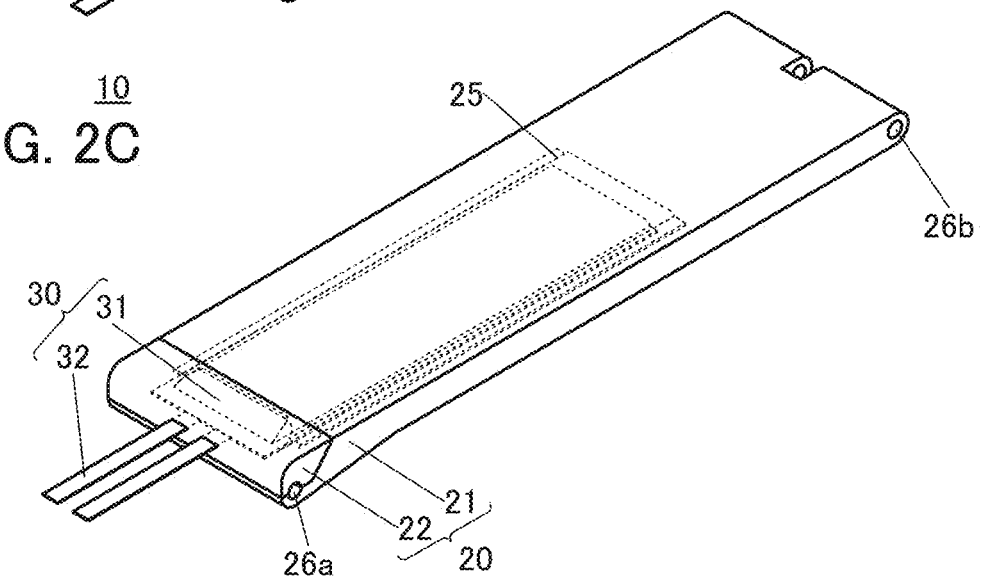

Next, the battery 30 is inserted into the depression 23 from the opening edge 24 side of the first portion 21 (FIG. 1C and FIG. 2B).

The battery 30 includes an exterior body 31 and a pair of tabs 32. Here, an example of the case of using a film-like material for the exterior body 31 is described. A positive electrode, a negative electrode, and an electrolyte are sealed in the exterior body 31. The pair of tabs 32 are electrically connected to the positive electrode and the negative electrode and provided so as to project outside the exterior body 31. The exterior body 31 has a structure in which its side opposite to the side provided with the tabs 32 (also referred to as a bottom portion) is bent and three sides are bonded (sealed). Here, in some cases, among the sealed three sides of the exterior body 31, the side on the tabs 32 side is referred to as a top sealing portion, and the other two sides are each referred to as a side sealing portion. Note that in FIG. 1C and the like, the internal structure of the battery 30 is not illustrated.

The battery 30 is provided so that at least part of the tabs 32 overlaps with the opening edge 24 and the other part of the tabs 32 projects outside the opening edge 24. The battery 30 may be provided so that an end portion of the exterior body 31 on the tab 32 side (the top sealing portion) is positioned at the opening edge 24.

As illustrated in FIG. 1C, when the battery 30 is inserted into the first portion 21, a space may be provided between the first portion 21 and a bottom portion of the battery 30. Note that in the case where the battery 30 is provided so as to pass through the neutral plane of the exterior body 31, for example, the space is not necessarily provided and the battery 30 may be provided so that the first portion 21 and the bottom portion of the battery 30 are in contact with each other.

Next, as illustrated in FIG. 1D, the battery 30 and the first portion 21 are provided in the mold 50b for molding the second portion 22.

The mold 50b includes an upper mold 52a, a lower mold 52b, and the like. FIG. 1D illustrates an example in which the cores 54a and 54b are used. The upper mold 52a includes an injection hole 55b. In addition, the upper mold 52a or the lower mold 52b includes a vent hole (not illustrated).

The injection hole 55b of the mold 50b is provided only in the vicinity of the opening edge 24 of the first portion 21. Thus, a material to be mold is injected only into the vicinity of the opening edge 24. Accordingly, in the second molding, a pressure in the molding is applied only to part of the battery 30 which is in the vicinity of the opening edge 24 (the tabs 32, the top sealing portion of the exterior body 31, and the like), and not applied to the other part. Therefore, the exterior body 31 of the battery 30 can be prevented from changing its shape and being damaged. Because the tabs 32 and the top sealing portion of the exterior body 31 have a small thickness and do not have a hollow structure, a small change in the shape might occur due to application of a pressure in the molding. However, there is no possibility that damage occurs.

When the material is molded using the mold 50b illustrated in FIG. 1D, the second portion 22 can be formed in contact with the first portion 21. Thus, the exterior body 20 including the first portion 21 and the second portion 22 can be formed.

The method for molding the first portion 21 can be referred to for a method for molding the second portion 22. It is preferable that the second portion 22 be formed by the method for forming the first portion 21, in which case a facility can be shared.

Furthermore, it is preferable that the second portion 22 be molded using the same material as the first portion 21. This is because the adhesion between the first portion 21 and the second portion 22 can be increased.

Note that the first portion 21 and the second portion 22 may be molded using different materials and different molding methods. For example, the first portion 21 is formed using a millable thermosetting rubber material by transfer molding to have high weather resistance and high chemical resistance. Then, the second portion 22 is molded using a liquid thermoplastic elastomer by injection molding and thus formed with a low pressure. In that case, damage to the battery 30 in molding the second portion 22 can be reduced more effectively.

The above is the description of a manufacturing method example.

FIG. 1E and FIG. 2C illustrate the battery module 10. The battery module 10 includes the exterior body 20 and the battery 30.

The second portion 22 is bonded directly to the first portion 21. The second portion 22 is provided so as to fill the opening edge 24 included in the first portion 21. Thus, a space 25 surrounded by the first portion 21 and the second portion 22 is formed in the exterior body 20. Part of the battery 30 is positioned in the space 25.

Part of the tabs 32 in the battery 30 projects from the second portion 22 and is exposed to the outside. The tabs 32 can be electrically connected to a circuit board, terminals of an electronic device to which the battery module 10 is to be connected, or the like.

In the battery 30, the other part of the tabs 32 and the top sealing portion of the exterior body 31 are provided in contact with the second portion 22. Accordingly, the battery 30 is fixed to the exterior body 20 by the second portion 22. The other part of the exterior body 31 is not bonded to the first portion 21. Therefore, for example, when the first portion 21 changes its shape, for example, is bent, the exterior body 31 of the battery 30 and the first portion 21 can change their shapes independently from each other, and thus they can be bent by weaker force.

Here, an example in which the exterior body 20 of the battery module 10 includes a hole 26a and a hole 26b each penetrating in the width direction is described. The hole 26a provided on the tab 32 side is provided for connection to a housing (a case) of an electronic device using a spring bar or the like. The hole 26b is provided for attachment of a buckle or the like.

The exterior body 20 has a feature that the first portion 21 formed first is larger than the second portion 22 formed later. Specifically, the volume or the surface area of the second portion 22 is smaller than that of the first portion 21. It can also be said that at least one of the width, the length, and the thickness of the second portion 22 when seen from the top surface or the side surface is smaller than that of the first portion 21. When the second portion 22 is formed smaller, the load on the battery 30 in forming the second portion 22 can be reduced.

The above is the description of Structure Example 1.

Modification Example 1

FIGS. 3A to 3D are schematic cross-sectional views at respective stages in a manufacturing method example described here. The method exemplified here differs from the above manufacturing method example in that a mold 50c and a mold 50d having different shapes are used.

In the above manufacturing method example, as illustrated in FIG. 1B and FIG. 2A, the first portion 21 has a shape such that the vicinity of the opening edge 24 is cut out obliquely. In contrast, in the mold 50c illustrated in FIG. 3A, a space (a cavity) into which a material to be molded is injected is formed in the mold 50c so that a portion other than a portion into which a core 53 is inserted is formed.

First, the first portion 21 is formed using the mold 50c by the molding method exemplified in the above manufacturing method example.

Figure 3A:
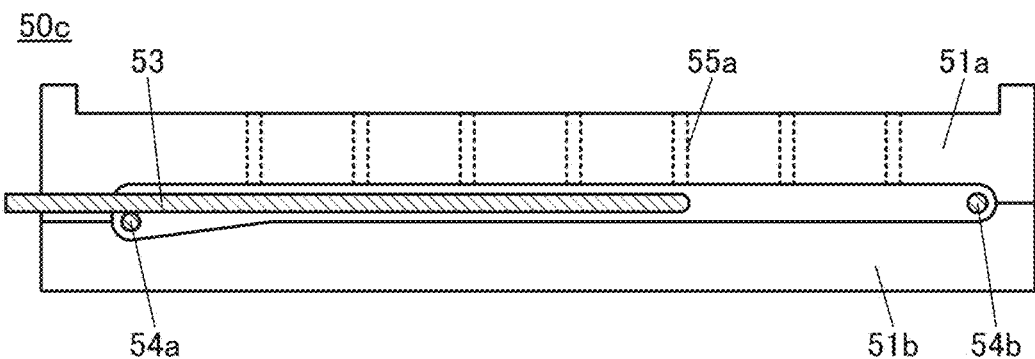
FIGS. 3A to 3E illustrate a structure example of a battery module of an embodiment and a method for manufacturing the battery module of an embodiment.
Figure 3B:
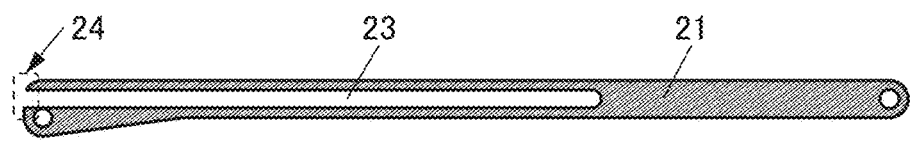

FIG. 3B is a schematic cross-sectional view of the first portion 21 molded using the mold 50c. The opening edge 24 of the first portion 21 is positioned on a side surface of the first portion 21.

Figure 3C:
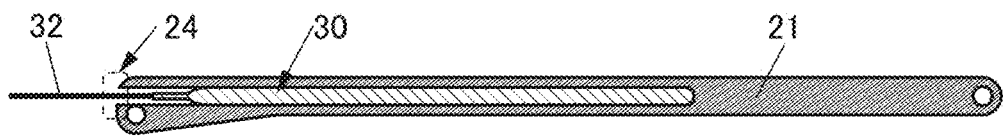

Next, as illustrated in FIG. 3C, the battery 30 is inserted into the depression 23 of the first portion 21 from the opening edge 24 side. FIG. 3C illustrates an example of the case where the battery 30 is inserted so that an end portion of the battery 30 which is on a side opposite to the tab 32 side is in contact with a surface of the depression 23 of the first portion 21.

Figure 3D:
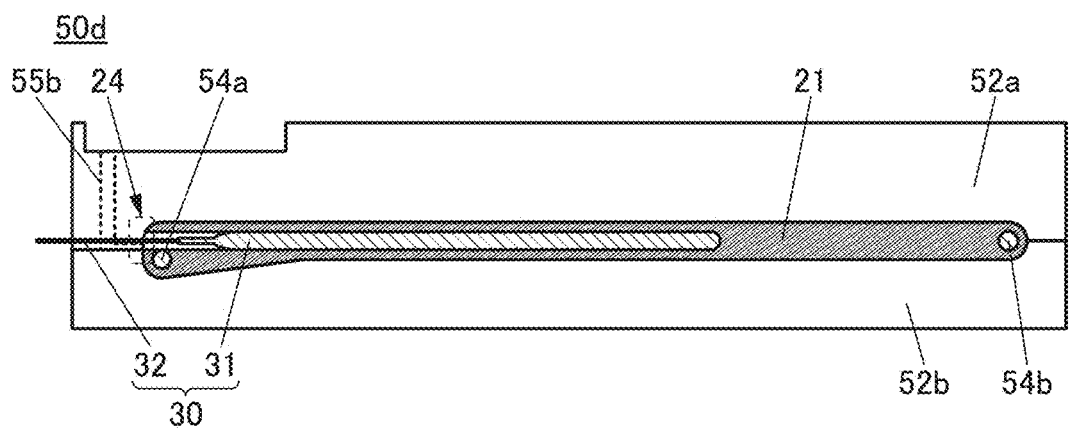

Next, as illustrated in FIG. 3D, the first portion 21 into which the battery 30 is inserted is provided in the mold 50d.

The mold 50d differs from the mold 50b in the shape of part of the upper mold 52a and the lower mold 52b and the position of the injection hole 55b. The mold 50d is processed so that a material to be molded is injected on the opening edge 24 side positioned at the end portion of the first portion 21.

Next, the second portion 22 is formed using the mold 50d by the molding method exemplified in the above manufacturing method example.

When the second portion 22 is formed by the manufacturing method example described here, in the second molding, the area where the battery 30 and the material to be molded are in contact with each other can be made small. Thus, a pressure and the like applied to the battery 30 in the second molding can be reduced, leading to formation with high yield.

Figure 3E:
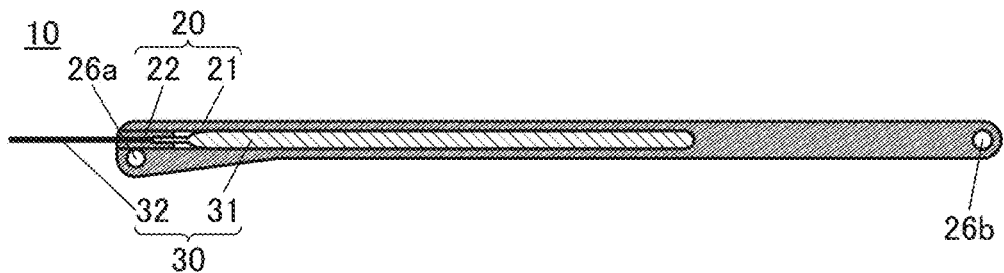

The battery module 10 manufactured in the above-mentioned method is illustrated in FIG. 3E. Although the battery module 10 illustrated in FIG. 3E has the same external shape as that illustrated in FIG. 1E and FIG. 2C, the battery module 10 illustrated in FIG. 3E differs from that illustrated in FIG. 1E and FIG. 2C in the shape of the second portion 22. The battery module 10 illustrated in FIG. 3E can be distinguished from that illustrated in FIG. 1E and FIG. 2C by a difference in the shape of the boundary (the parting line) formed on a surface of the battery module 10. In an example illustrated in FIG. 3E, the boundary between the first portion 21 and the second portion 22 is positioned only at an end portion of the battery module 10 on the attachment side and thus is less likely to be viewed by a user when connection to an electronic device is performed, so that a secondary effect such as a high design property can also be obtained.

The above is the description of Modification Example 1.

Modification Example 2

Although the case of using the projecting part of the tabs 32 included in the battery 30 as the electrodes of the battery module 10 is described in the above structure example, another structure may be employed.

Figure 4A:
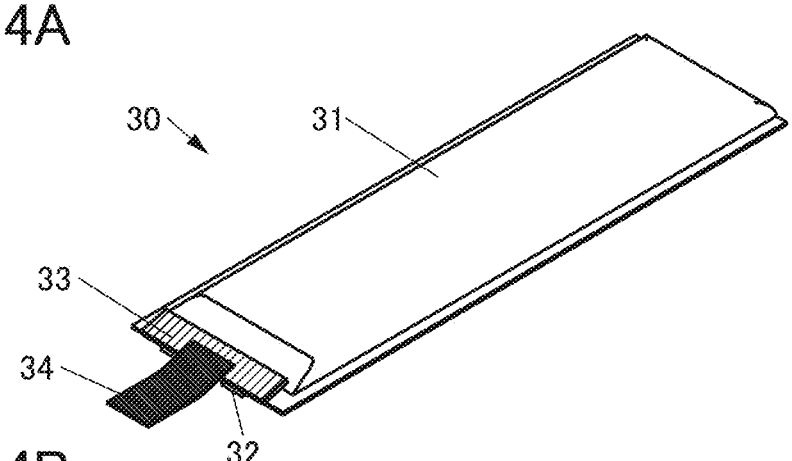
FIGS. 4A to 4C illustrate structure examples of a battery and a battery module of an embodiment.
Figure 4B:
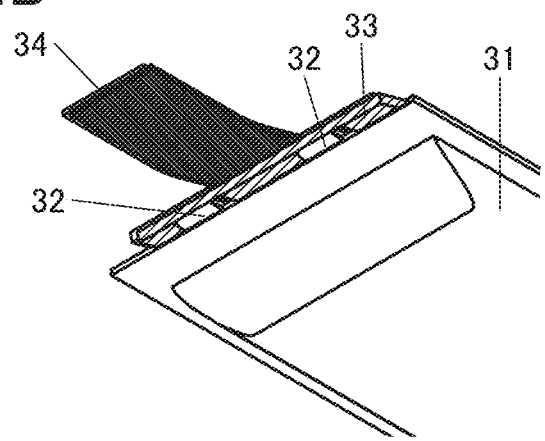

FIGS. 4A and 4B illustrate an example of the case where the battery 30 includes a circuit board 33. FIG. 4A is a schematic perspective view of the battery 30, and FIG. 4B is an enlarged schematic perspective view when the battery 30 in FIG. 4A is seen from the rear side.

The battery 30 includes the circuit board 33 and a flexible printed circuit (FPC) 34. The circuit board 33 is provided to overlap with the top sealing portion of the exterior body 31.

The circuit board 33 can include a protection circuit, for example. As the protection circuit, a circuit having a function of stopping charging in the case where the battery 30 is over charged, a function of stopping discharging in the case where the battery 30 is over discharged, or the like can be used, for example. In addition, the protection circuit preferably has a function of preventing a high current flow in the case where the positive electrode and the negative electrode are electrically shorted. The protection circuit may have a function of outputting data of the temperature of a cell in the battery 30 or a function of stopping discharging or charging in accordance with the temperature.

The circuit board 33 may include a protection circuit which detects leakage from the battery 30. For example, it is possible to use a circuit having a structure in which a plurality of wirings which are apart from each other and electrically insulated from each other are provided along the surface of the exterior body 31 and having a function of detecting an electrical short-circuit when an electrolytic solution touches two wirings.

As the circuit board 33, a printed circuit board (PCB), an FPC, or the like can be used. An IC chip including the protection circuit or the like can be mounted on the circuit board 33.

The pair of tabs 32 are bent and bonded to terminals included in the circuit board 33. An FPC 34 is connected to the circuit board 33. The FPC 34 is electrically connected to a terminal for the positive electrode, a terminal for the negative electrode, a terminal for outputting data of temperature, and the like, which are included in the circuit board 33. The FPC 34 can be connected to a connector or the like included in an electronic device.

Figure 4C:
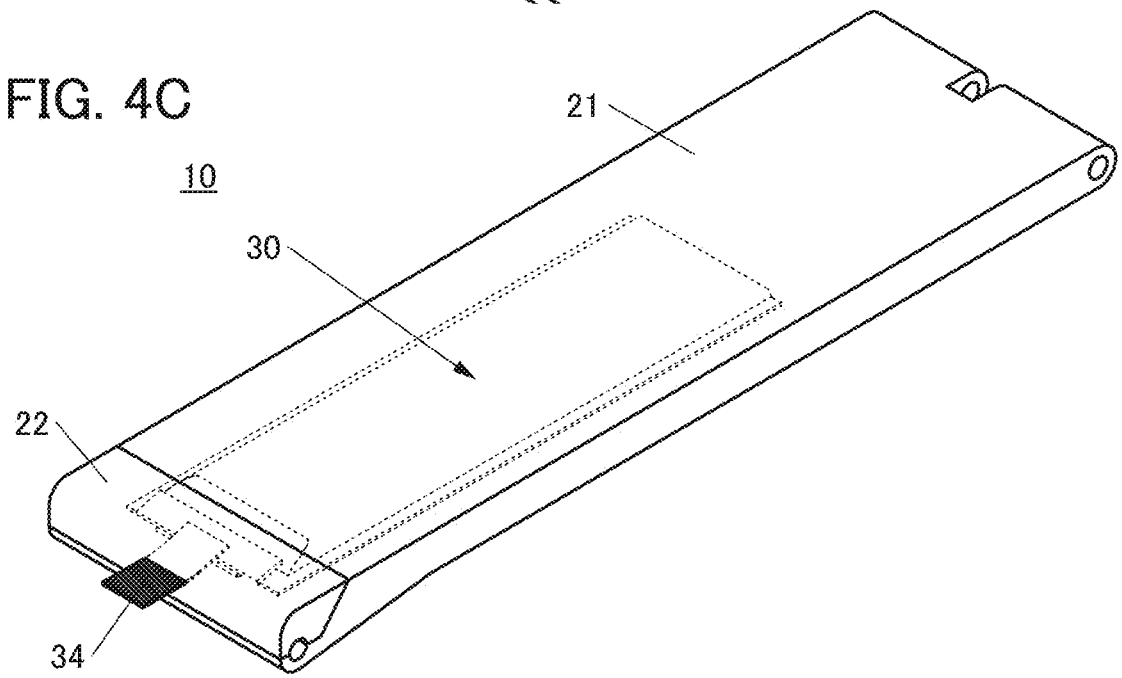

FIG. 4C is a schematic perspective view of the battery module 10 including the battery 30 illustrated in FIG. 4A. As illustrated in FIG. 4C, the battery 30 is provided so that part of the FPC 34 is provided to project from the second portion 22 of the exterior body 20.

The above is the description of Modification Example 2.

Modification Example 3

When the exterior body 20 has a band-like shape as exemplified above, part of the exterior body 20 which is provided with the battery 30 is thinner than the other part thereof in some cases. In the case where great force is locally applied in a direction perpendicular to a surface of the exterior body 20 from the outside, there is a possibility that the battery 30 changes its shape or is damaged. Accordingly, a protection member for protecting a surface of the battery 30 is preferably provided inside the exterior body 20.

Figure 5A:
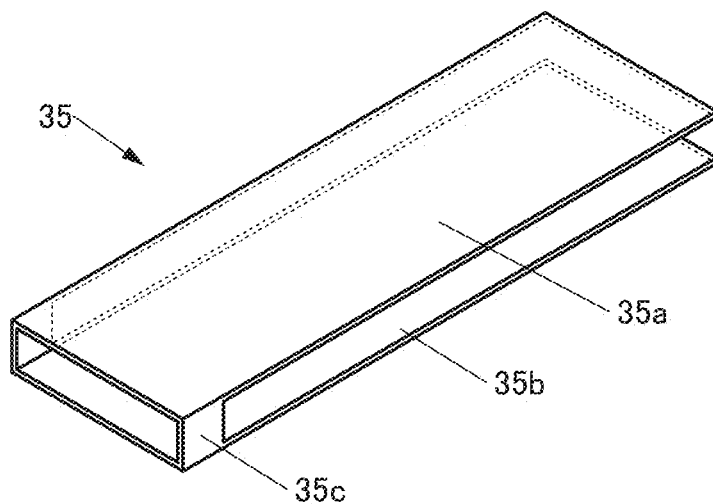
FIGS. 5A and 5B illustrate a method for manufacturing a battery module of one embodiment.

FIG. 5A illustrates an example of a protection member 35. The protection member 35 has a shape in which a plate portion 35a and a plate portion 35b facing each other are bonded with a bonding portion 35c. The two plate portions are provided substantially parallel to be apart from each other so that a space into which the battery 30 is inserted is formed. The plate portions 35a and 35b are bonded to each other with the bonding portion 35c at one short side included in each of the plate portions 35a and 35b.

Figure 5B:
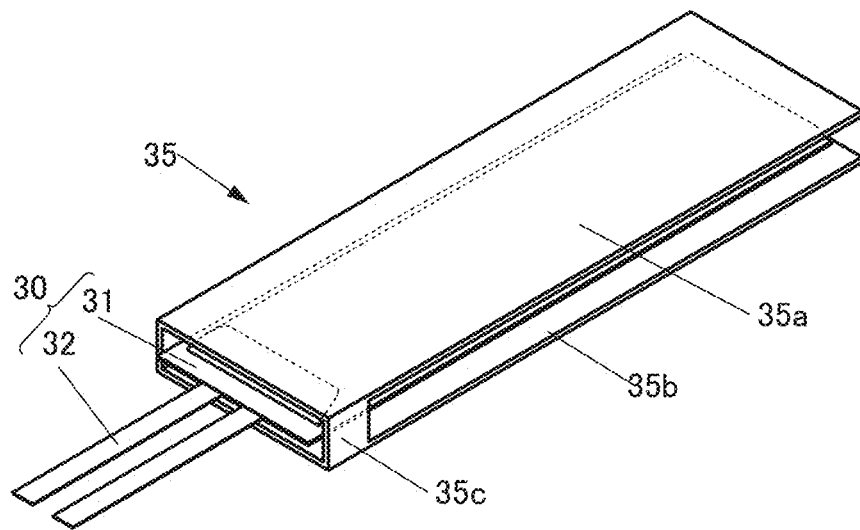

FIG. 5B illustrates the case where the battery 30 is inserted into the protection member 35. At this time, the battery 30 and the protection member 35 may be fixed or are not necessarily fixed. In the case where the battery 30 and the protection member 35 are fixed, they are preferably fixed in the vicinity of the top sealing portion of the battery 30 and the bonding portion 35c of the protection member. In either case, the relative positions of the battery 30 and the protection member 35 are fixed by the second portion 22 of the exterior body 20 when they are incorporated in the exterior body 20 of the battery module 10.

As a material of the protection member 35, for example, metal, plastic, wood, or the like can be used. It is particularly preferable that the plate portions 35a and 35b be thin enough to have flexibility in the case where the battery module 10 is bent and used. When the battery module 10 is bent and used, the thickness of the protection member 35 is, for example, preferably greater than or equal to 0.02 mm and less than or equal to 2 mm, further preferably greater than or equal to 0.05 mm and less than or equal to 1 mm, still further preferably greater than or equal to 0.1 mm and less than or equal to 0.7 mm. Typically, it is preferable that a metal plate having a thickness of 0.1 mm be used for the plate portions 35a and 35b. With such a thickness, a user can wear the battery module 10 without uncomfortable feeling. Note that in the case where the battery module 10 is not used in a bent state, there is no limitation to the thickness, and the protection member 35 preferably has a larger thickness, in which case the strength can be increased.

With the protection member 35 described above, the battery 30 can be protected from local pressure.

FIG. 6A1 is a schematic cross-sectional view of the battery module 10 to which the protection member 35 is applied in a length direction. FIG. 6A2 is a schematic cross-sectional view of the battery module 10 in a width direction. FIGS. 6A1 and 6A2 each illustrate the plate portions 35a and 35b of the protection member 35. As illustrated in FIGS. 6A1 and 6A2, the battery 30 is provided in the exterior body 20 in a state where the battery 30 is interposed between the plate portions 35a and 35b.

FIG. 6A3 is an enlarged view of a region surrounded by a dashed line in FIG. 6A1. As illustrated in FIG. 6A3, end portions of the plate portions 35a and 35b preferably project in the length direction so that they are positioned outward from the exterior body 31 of the battery 30. As illustrated in FIG. 6A2, the widths of the plate portions 35a and 35b are each preferably larger in the width direction than the width of the battery 30 not including the widths of the side sealing portions. In other words, the end portions of the plate portions 35a and 35b in the width direction preferably overlap with the side sealing portions of the battery 30.

In the case where the battery module 10 is bent and used here, it is preferable that part of the battery 30 and part of the plate portions 35a and 35b other than those in the vicinity of the bonding portion 35c not be fixed. That is, the battery 30 and the plate portions 35a and 35b preferably change their shapes independently from each other by being shifted from each other when the battery module 10 is bent.

FIG. 6B1 is a schematic cross-sectional view of the battery module 10 bent so that the plate portion 35b lies on the inward side, and FIG. 6B2 is an enlarged view of a region surrounded by a dashed line in FIG. 6B1.

At this time, the battery 30 is provided so that the neutral plane of the first portion 21 of the exterior body 20 is positioned in a substantially central portion of the battery 30. Therefore, the relative positions of the end portion of the battery 30 and the first portion 21 hardly change when the battery module 10 is bent. In contrast, the plate portion 35a which lies on the outward side in the bending changes its shape so that the end portion is apart from an inner wall of the first portion 21. The plate portion 35b which lies on the inward side in the bending changes its shape so that the end portion is closer to the inner wall of the first portion 21.

FIGS. 6C1 and 6C2 illustrate the case where bending is performed so that the plate portion 35b lies on the outward side. At this time, the end portion of the plate portion 35a slides closer to the inner wall of the first portion 21, and the end portion of the plate portion 35b slides apart from the inner wall of the first portion 21.

Thus, when the space is provided between the first portion 21 and the end portions of the plate portions 35a and 35b in a state where the battery module 10 is not bent, the battery module 10 can be bent by weak force without the first portion 21 and the end portion of the plate portions 35a or 35b being in contact with each other.

Here, when the lengths of the plate portions 35a and 35b are made different, a function of preventing the battery module 10 from being bent too much can be achieved.

FIGS. 7A1 and 7A2 illustrate an example of the case where the end portion of the plate portion 35a is in contact with the inner wall of the first portion 21 of the exterior body 20 in a state where the battery module 10 is unbent. The end portion of the plate portion 35b is not in contact with the inner wall of the first portion 21, and the space is provided therebetween.

In the case where bending is performed so that the plate portion 35a lies on the inward side as illustrated by an arrow in FIG. 7A1 here, there is no space to which the end portion of the plate portion 35a slides outside, and thus the plate portion 35a cannot be bent. As a result, the plate portion 35a serves as a stopper, and thus the battery module 10 cannot be bent.

In contrast, in the case where bending is performed so that the plate portion 35a lies on the outward side, there is a space between the end portion of the plate portion 35b and the inner wall of the first portion 21, so that the battery module 10 can be bent.

FIGS. 7B1 and 7B2 each illustrate a cross section when bending is performed so that the plate portion 35b lies on the inward side. At this time, the end portion of the plate portion 35a slides apart from the inner wall of the first portion 21, and the end portion of the plate portion 35b slides closer to the inner wall.

FIGS. 7C1 and 7C2 each illustrate a cross section when bending is performed with a larger curvature. At this time, when the end portion of the plate portion 35b is in contact with the inner wall of the first portion 21, for the same reason as described above, the plate portion 35b serves as a stopper, and thus the battery module 10 cannot be further bent.

When the shape of the space 25 and the lengths of the plate portions 35a and 35b are changed in this manner, the movable range of the battery module 10 can be limited.

When the end portion of the plate portion 35a (or the plate portion 35b) is in contact with the inner wall of the first portion 21 in bending the battery module 10, repulsion force is generated, and thus force which is necessary for bending the battery module 10 becomes large as compared with the case where the plate portion 35 (or the plate portion 35b) is not in contact with the inner wall of the exterior body 20. Accordingly, a user can notice the movable range of the battery module 10, and thus the battery module 10 can be prevented from being bent too much unintentionally and damaged.

Note that when the lengths of the plate portions 35a and 35b are made equal to each other, the allowable radius of curvature of the battery module 10 in the case where bending is performed so that the plate portion 35a lies on the inward side can be substantially equal to that in the case where bending is performed so that the plate portion 35b lies on the inward side. In contrast, when the plate portions 35a and 35b have different lengths, the allowable radius of curvature can be made different depending on the bending direction.

FIGS. 8A1, 8A2, and 8A3 illustrate an example of the case where a slit 21a, a slit 21b, and a slit 21c each serving as a guide are provided in the exterior body 20. With the slits 21a, 21b, and 21c, shapes into which the plate portions 35a and 35b change can be predetermined when the exterior body 20 is bent.

The end portion of the plate portion 35a is inserted into the slit 21a. The end portion of the plate portion 35b is inserted into the slit 21b. Here, an example of the case where the plate portion 35a is longer than the plate portion 35b in the length direction so that the end portion of the plate portion 35a is in contact with the inner wall of the slit 21a is illustrated. Accordingly, FIGS. 8A1 and 8A3 illustrate an example of the battery module 10 designed so that the plate portion 35a cannot be bent so as to lie on the inward side.

When the battery module 10 is bent so that the plate portion 35b lies on the inward side as illustrated in FIGS. 8B1 and 8B2, the plate portion 35a can slide along the slit 21a, and the plate portion 35b can slide along the slit 21b.

When the battery module 10 is further bent as illustrated in FIGS. 8C1 and 8C2, the end portion of the plate portion 35b is in contact with the inner wall of the slit 21b, and thus the battery module 10 cannot be further bent.

Thus, the slits 21a and 21b each serve as a guide for defining a direction in which the plate portions 35a and 35b slide. By provision of the slits 21a and 21b, even when the battery module 10 is bent and unbent repeatedly, the end portions of the plate portions 35a and 35b can be prevented from changing their shapes, so that the battery module 10 can have high reliability.

Here, the lengths of the slits 21a and 21b and the lengths of the plate portions 35a and 35b can be set in accordance with the movable range of the battery module 10. Although the lengths of the slits 21a and 21b are substantially equal to each other here, they may be different from each other.

Although the battery module 10 has a structure in which the end portion of the plate portion 35a is in contact with the inner wall of the slit 21a in a state where the battery module 10 is not bent (FIG. 8A1), the battery module 10 may be bent so that the plate portion 35a lies on the inward side by provision of a space between the end portion of the plate portion 35a and the inner wall of the slit 21a.

The lengths of the plate portion 35a and the slit 21a are preferably set so that the end portion of the plate portion 35a is positioned in the slit 21a when the end portion of the plate portion 35a slides innermostly (on the second portion 22 side) as illustrated in FIG. 8C2. Similarly, the lengths of the plate portion 35b and the slit 21b are preferably set so that the end portion of the plate portion 35b is positioned in the slit 21b when the end portion of the plate portion 35b slides innermostly (on the second portion 22 side) as illustrated in FIG. 8A3.

FIG. 8A2 is a schematic cross-sectional view in the width direction. FIG. 8A2 illustrates an example in which the widths of the plate portions 35a and 35b are each larger in the width direction than the width of the battery 30 including the widths of the side sealing portions. The exterior body 20 is provided with the slits 21c into which the end portions of the plate portions 35a and 35b in the width direction are inserted. With such a structure, the plate portions 35a and 35b are less likely to be shifted with respect to the exterior body 20 in the width direction. Accordingly, the exterior body 20 and the plate portions 35a and 35b are more integrated in bending the battery module 10, so that a user can wear the battery module 10 without uncomfortable feeling.

The above is the description of Modification Example 3.

Structure Example 2

An example of a battery module including a frame to which an electronic device can be attached is described below.

Figure 9A:
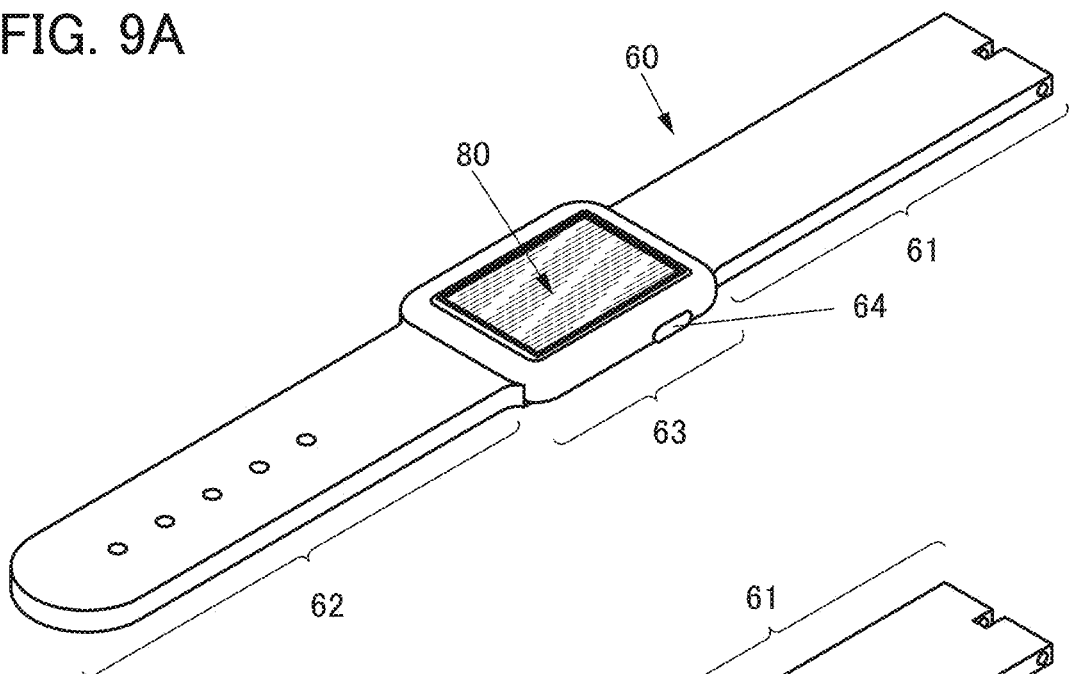
FIGS. 9A to 9C illustrate structure examples of a battery module and an electronic device of an embodiment.

FIG. 9A illustrates a battery module 60 to which an electronic device 80 is attached. The battery module 60 can also be used as a wearing tool of the electronic device 80. Accordingly, a device in which the electronic device 80 and the battery module 60 are combined can be used as a watch-type terminal device, for example. The electronic device 80 can be attached to and detached from the battery module 60 on the rear side.

Figure 9B:
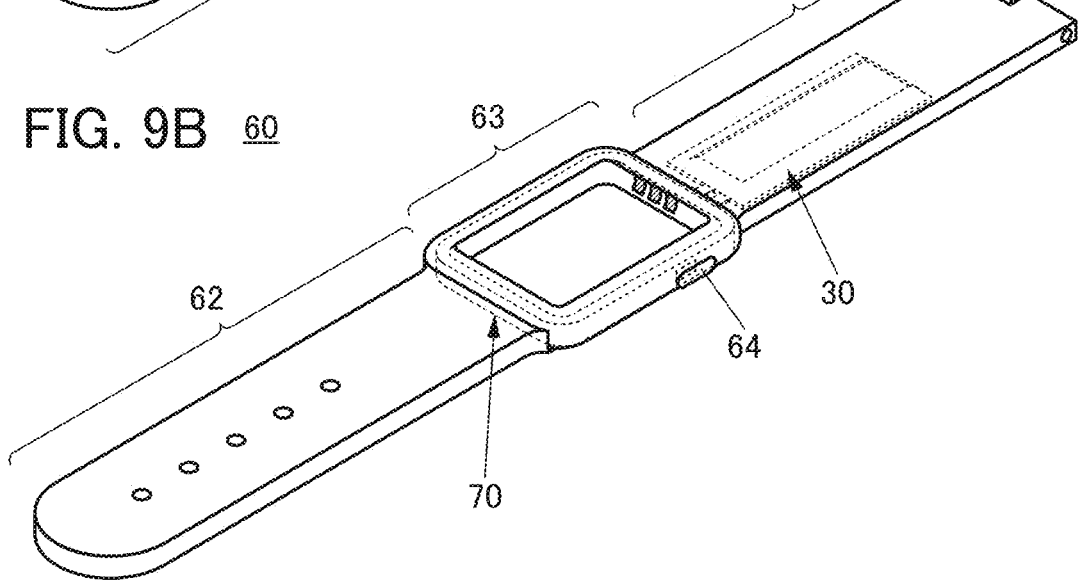
Figure 9C:
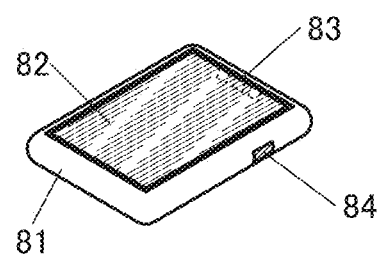

FIG. 9B illustrates the battery module 60 from which the electronic device 80 is detached and FIG. 9C illustrates the electronic device 80.

The battery module 60 includes a band portion 61, a band portion 62, and a holding portion 63. The battery 30 is included in the band portion 61. The holding portion 63 is a portion for holding the electronic device 80. The holding portion 63 includes a frame 70. In addition, the holding portion 63 includes an operation button 64.

The electronic device 80 includes a housing 81. The housing 81 includes a display portion 82, a terminal 83, and a terminal 84.

In the battery module 60, an elastic body such as rubber is used for the band portion 61, the band portion 62, and the holding portion 63. The band portion 61 and the band portion 62 are bonded directly to the holding portion 63, so that it can be said that they are integrated with each other. In the holding portion 63, an elastic body such as rubber is directly formed so as to cover part of the frame 70. Accordingly, an adhesive or the like is not used for bonding the frame 70 and an exterior body covering the frame 70, and thus the bonding strength is increased.

Figure 10A:
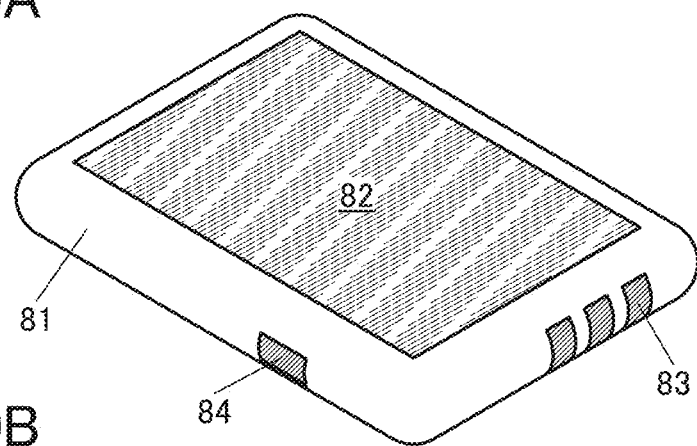
FIGS. 10A to 10C illustrate structure examples of a frame and an electronic device of an embodiment.
Figure 10B:
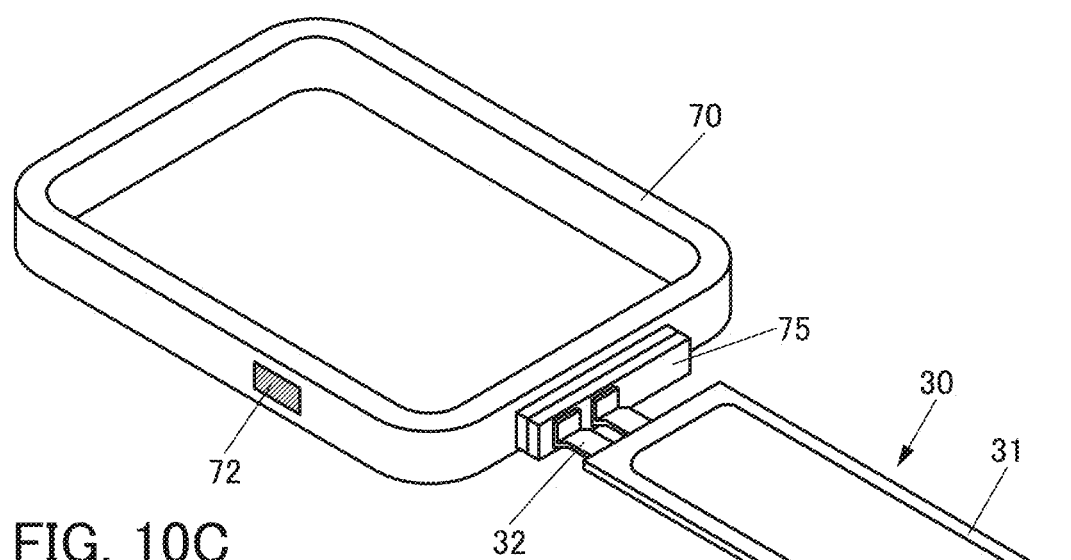
Figure 10C:
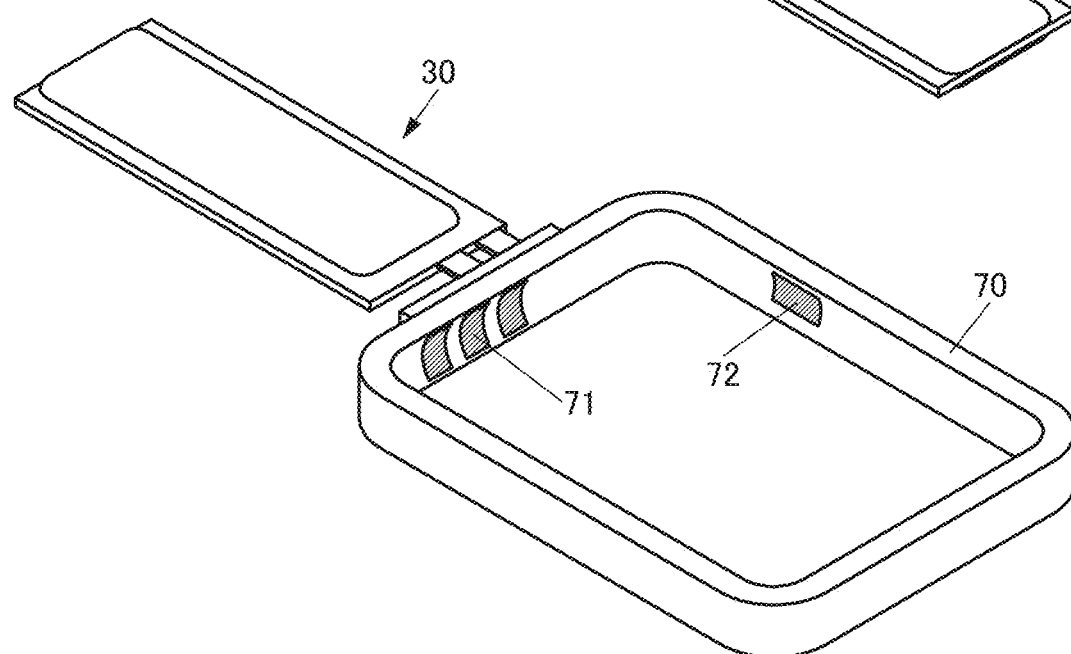

FIG. 10A illustrates the electronic device 80 when seen from the side of the terminals 83 and 84. FIG. 10B illustrates the frame 70 to which the battery 30 is connected. FIG. 10C illustrates the frame 70 in FIG. 10B which is rotated 180 degrees.

The frame 70 has a frame-like shape into which the electronic device 80 fits. An inner surface of the frame 70 is provided with three terminals 71 and a terminal 72.

The housing 81 of the electronic device 80 is provided with the three terminals 83 and the terminal 84. The three terminals 71 provided on the inner surface of the frame 70 are provided at a position where the three terminals 71 are in contact with the terminals 83 when the electronic device 80 is attached. Similarly, the terminal 72 is provided at a position where the terminal 72 is in contact with the terminal 84.

A case 75 is attached to an outer surface of the frame 70. The tabs 32 of the battery 30 are bonded to a pair of terminal portions included in the case 75. The circuit board 33 (not illustrated) exemplified in Modification Example 2 above is provided in the case 75. The three terminals 71 provided for the frame 70 are electrically connected to a terminal for a positive electrode, a terminal for a negative electrode, and a terminal for outputting data of temperature of the circuit board 33 (not illustrated).

The terminal 72 is a portion where the operation button 64 provided for the holding portion 63 illustrated in FIG. 9B is connected to the terminal 84 included in the electronic device 80. The terminal 84 may be a physical button or an electrode. In the case where the terminal 84 is a physical button, the terminal 72 is formed using a movable member, and the terminal 84 may be pushed with the terminal 72 interposed therebetween when the operation button 64 is pushed, for example. When the terminal 84 is an electrode, the terminal 72 may be an electrical switch, and when the operation button 64 is pushed, for example, the terminal 72 may have a function of transmitting an electric signal showing conduction or non-conduction to the terminal 84.

For the frame 70, a material which can withstand molding of an exterior body can be used. For example, any of a variety of materials such as plastic, metal, an alloy, glass, and wood can be used. It is preferable to use, for the frame 70, a material having higher rigidity than at least the materials for the exterior body covering the frame 70, the band portion 61, and the band portion 62.

By the electronic device 80 being attached, such a battery module 60 can be used as a main power supply or an auxiliary power supply of the electronic device 80. The battery module 60 includes the frame 70 to and from which the electronic device 80 can be attached and detached easily and thus can be replaced freely by a user as appropriate.

Note that although not illustrated, the battery module 60 preferably includes a power receiving unit such as a terminal for power receiving or an antenna capable of receiving power wirelessly. In the case where the electronic device 80 has a function of receiving power, the battery 30 may be charged by transmission of power received by the electronic device 80 to the battery 30 through the terminals 71.

Next, an example of a method for manufacturing the battery module 60 is described with reference to FIGS. 11A to 11C.

Figure 11A:
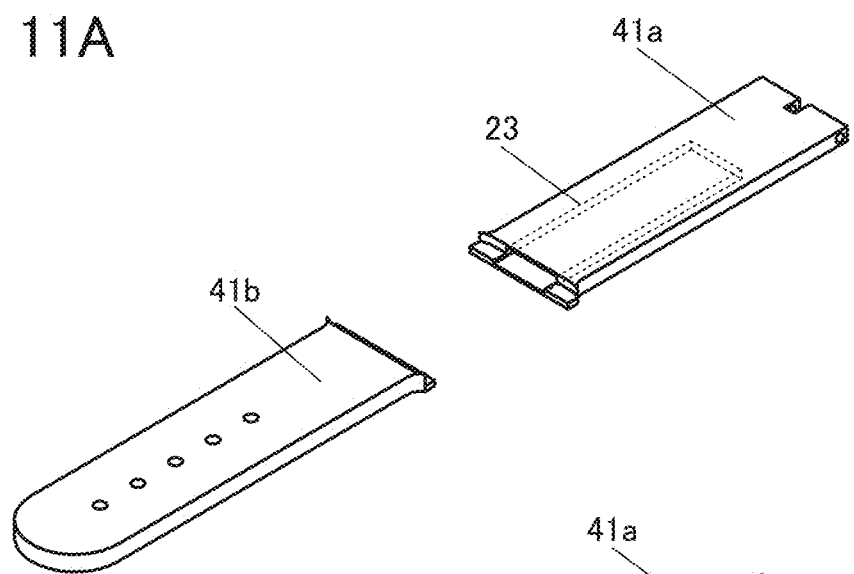
FIGS. 11A to 11C illustrate a method for manufacturing a battery module of an embodiment.

First, first molding using the first mold is performed, so that a first portion 41a is formed (FIG. 11A). The first portion 41a is a portion to be the band portion 61 later. The above method can be referred to for the molding method.

Furthermore, a first portion 41b is separately formed. The first portion 41b is a portion to be the band portion 62 later. Note that the first portion 41a and the first portion 41b may be formed at the same time using one mold.

Note that the battery 30 is not inserted on the first portion 41b side, and therefore, the band portion 62 and the holding portion 63 may be formed at the same time by formation of the first portion 41b in second molding described later.

Here, as illustrated in FIG. 11A, the depression 23 into which the battery 30 is inserted is formed in the first portion 41a. It is preferable that part of the first portion 41a and part of the first portion 41b each have a shape to be fitted to the frame 70.

Figure 11B:
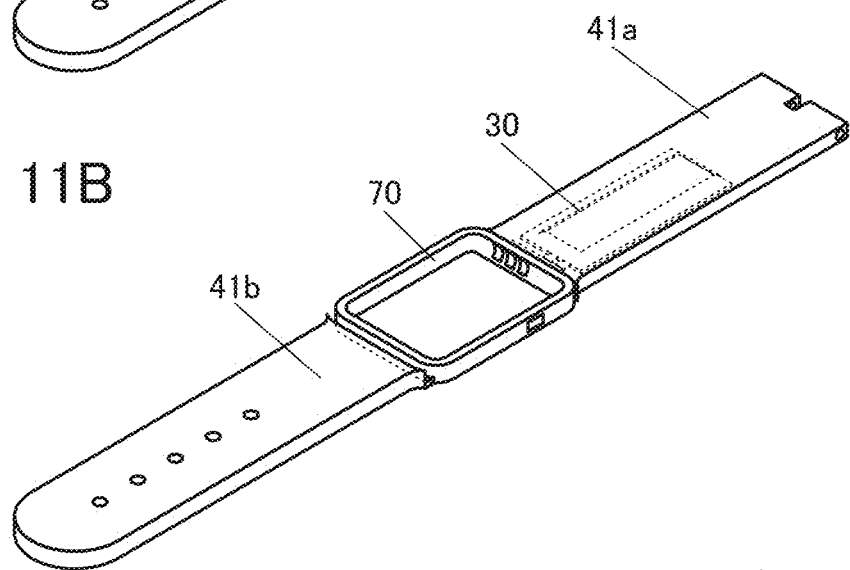

Next, the battery 30 bonded to the frame 70 is inserted into the first portion 41a (FIG. 11B).

Figure 11C:
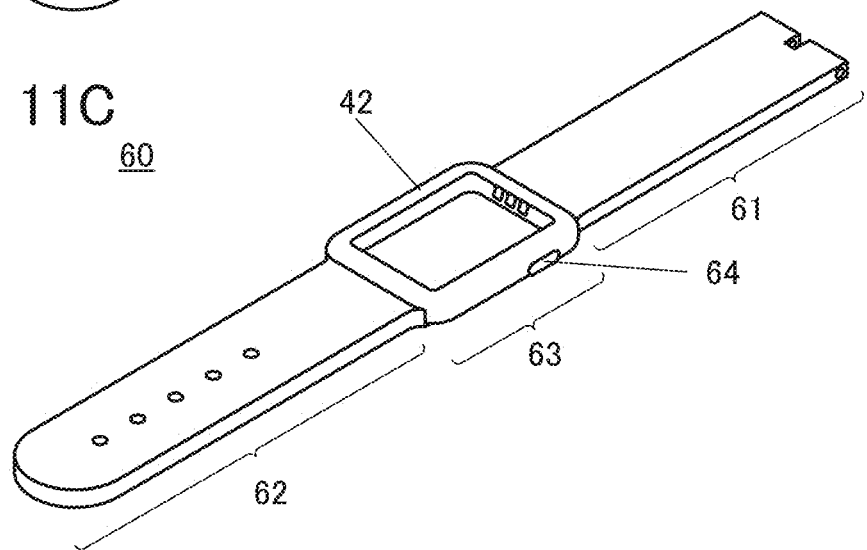

Next, the first portion 41a, the first portion 41b, and the frame 70 are provided in the second mold, and second molding is performed, so that a second portion 42 is molded (FIG. 11C). The second portion 42 is formed in contact with part of the first portion 41a, part of the first portion 41b, and part of the frame 70. The second portion 42 is formed so as to fill a space between the first portion 41a and the frame 70 and a space between the first portion 41b and the frame 70. Furthermore, the second portion 42 is formed so as to fill an opening of the depression 23 in the first portion 41a.

By the above method, the battery module 60 can be manufactured. Since the battery module 60 is integrated with an elastic exterior body, high impact resistance and a high design property can be obtained.

The above is the description of Structure Example 2.

Structure Example 3

In the case of using a conventional hard exterior body such as metal, there is a possibility of a change in shape or damage in dropping, collision, or the like. In particular, for portable electronic devices, such risk is higher. In contrast, according to one embodiment of the present invention, since the exterior body including an elastic body can be formed so as to cover the battery, high impact resistance can be obtained. Accordingly, the battery module of one embodiment of the present invention has a structure capable of being replaced with the conventional battery module, whereby an electronic device using the battery module can have extremely high reliability.

A method for manufacturing the battery module which can be favorably used for a portable electronic device is described below.

First, a battery 30a is prepared. Here, an example of using a wound battery as the battery 30a is described. The battery 30a includes the exterior body 31 and the pair of tabs 32.

Figure 12A:
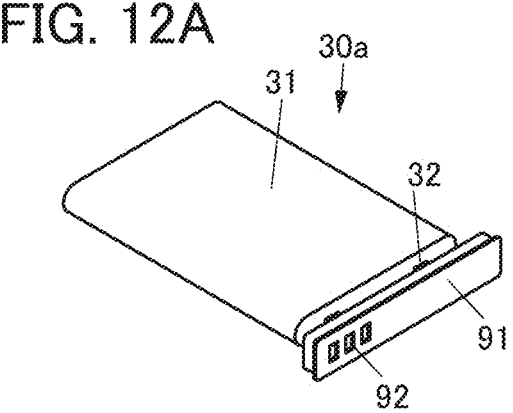
FIGS. 12A to 12E illustrate a method for manufacturing a battery module of an embodiment.

Next, a case 91 is bonded to the tabs 32 of the battery 30a (FIG. 12A).

Figure 12B:
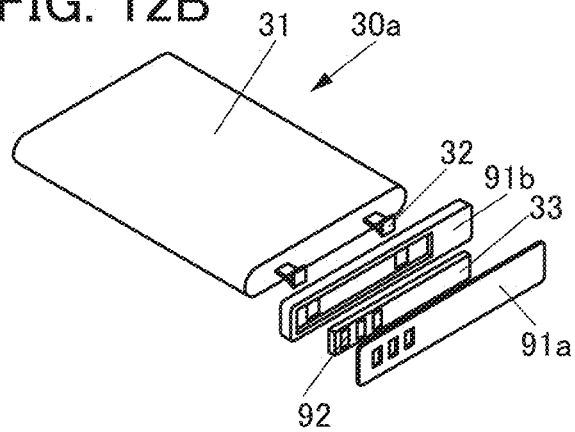

FIG. 12B is an exploded view of the case 91. The case 91 includes a top cover 91a, a bottom cover 91b, and the circuit board 33 provided therebetween. The bottom cover 91b includes terminals to be bonded to the tabs 32 of the battery 30a and terminals to be connected to the circuit board 33. The circuit board 33 includes three terminals 92. The top cover 91a has openings at positions overlapping with the terminals 92. Thus, the terminals 92 of the circuit board 33 are exposed.

Figure 12C:
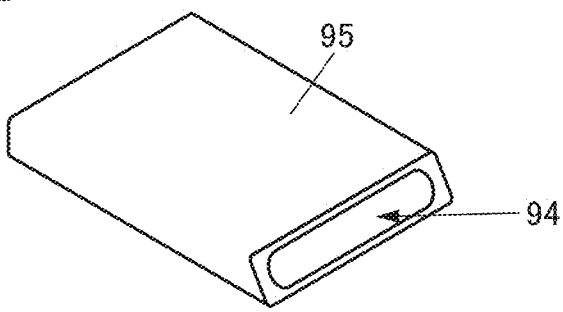

Next, the first molding using the first mold is performed, so that a first portion 95 is formed (FIG. 12C). The above method can be referred to for the molding method. A depression 94 into which the battery 30a can be inserted is formed in the first portion 95.

Figure 12D:
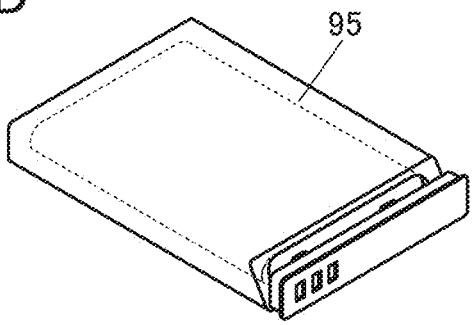

Next, the battery 30a is inserted into the depression 94 of the first portion 95 (FIG. 12D).

Figure 12E:
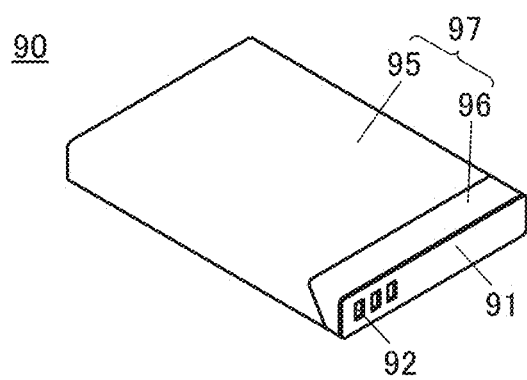

Next, the first portion 95, the battery 30a, and the case 91 are provided in the second mold, and the second molding is performed, so that a second portion 96 is molded (FIG. 12E). The second portion 96 is formed so as to fill an opening edge of the first portion 95. Furthermore, the second portion 96 is formed so as to fill a space between the first portion 95 and the case 91. In addition, it is preferable that the second portion 96 be formed so as to cover the bottom cover 91b of the case 91. The second portion 96 may be formed so as to cover part of the top cover 91a of the case 91. The top cover 91a serves as part of an exterior body of a battery module 90.

By the above method, the battery module 90 can be manufactured. Since an exterior body 97 of the battery module 90 is formed using an elastic body, extremely high impact resistance can be obtained as compared with the conventional battery module. Furthermore, in the battery module 90, the case 91 and the exterior body 97 are integrated with each other, and thus there is no space therebetween, so that entry of dust, water, and the like is not caused, so that the battery module 90 has high reliability.

The above is the description of Structure Example 3.

Application Example

The method for molding an exterior body which is one embodiment of the present invention can be applied not only to a battery module including a battery but also to a module incorporating a variety of electronic components. Thus, a module with high impact resistance can be obtained.

As an electronic component, for example, an electronic component including at least an exterior body and an electrode can be used. The above structure examples of the battery module and the above manufacturing method examples can be referred to for a structure of a module including an electronic component and a manufacturing method thereof, and the battery may be replaced with such an electronic component.

By any of the above methods for molding an exterior body, a variety of modules in each of which an electronic component having low resistance to pressure or high temperature is covered with an exterior body such as rubber and a terminal is exposed can be manufactured. As an electronic component, an IC chip such as a CPU, an FPGA, or a memory having a variety of functions, or an IC chip including a variety of sensors and the like can also be used, for example.

As a sensor, an acceleration sensor, an angular velocity sensor, a vibration sensor, a pressure sensor, a gyroscope sensor, an optical sensor, or the like can be given. A sensor obtaining biological information of body temperature, blood pressure, pulse rate, the amount of sweat, lung capacity, blood sugar level, blood alcohol concentration, $SpO_2$ (blood oxygen saturation), fingerprints, veins, iris, voice prints, or the like can also be applied. Besides, any of a variety of sensors which measure force, displacement, position, speed, acceleration, angular velocity, rotational frequency, distance, light, liquid, magnetism, temperature, a chemical substance, a sound, time, hardness, electric field, current, voltage, electric power, radiation, flow rate, humidity, gradient, vibration, smell, and infrared rays can be used.

When a light-transmitting material is used for an exterior body, application to a display device or the like such as a liquid crystal panel or an organic EL panel is possible. For example, a flexible display panel can be covered with a light-transmitting rubber or the like.

That is, one embodiment of the present invention is a module including a first exterior body and an electronic component. The electronic component includes a second exterior body and electrodes. The electrodes are provided so as to be exposed on a surface of the second exterior body. The first exterior body includes an elastic material. The first exterior body includes a first portion, a second portion, and a space surrounded by the first portion and the second portion. The electronic component is provided in the space, and the first portion and the second portion are bonded to each other. The second portion is in contact with the electrodes and the end portion of the second exterior body.

In the above, the first exterior body preferably includes a protection member. The protection member preferably includes a third portion covering one of two surfaces of the second exterior body, which are opposite to each other, and a fourth portion covering the other. It is preferable that the third portion and the fourth portion each have a plate-like shape and change its shape along the first exterior body.

Another embodiment of the present invention is a method for manufacturing a module including an electronic component and a first exterior body covering the electronic component, which includes the following steps. A first step is a step of preparing the electronic component including a second exterior body and electrodes. A second step is a step of forming a first portion including a depression by molding a first material using a first mold. A third step is a step of inserting the electronic component into the depression from the opening edge side so that part of the electrodes projects outside the opening edge of the depression. A fourth step is a step of forming the first exterior body in which the first portion and the second portion are bonded to each other in such a manner that the second portion which seals the opening edge of the depression is formed by providing the first portion into which the electronic component is inserted in a second mold and molding a second material using a second mold. The second portion is formed so that it is in contact with the end portion of the second exterior body and part of the electrodes is exposed at the outside of the second portion.

At least part of this embodiment can be implemented in combination with any of the other embodiments and an example described in this specification as appropriate.

Embodiment 2

Structure examples and manufacturing method examples of a secondary battery that can be used in one embodiment of the present invention be described below with reference to drawings. In particular, an example of a bendable secondary battery will be described below.

Structure Example

Figure 13:
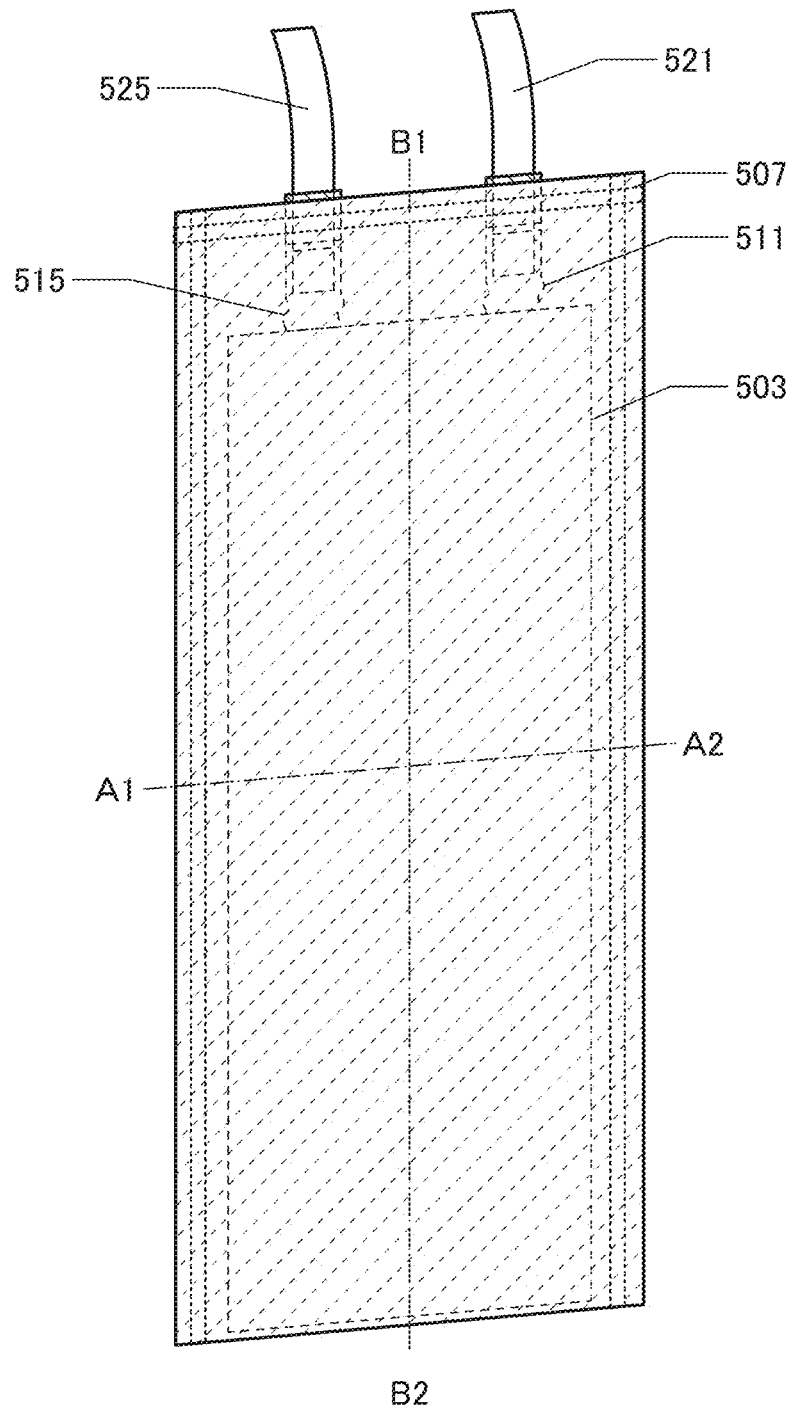
FIG. 13 illustrates a structure example of a secondary battery of an embodiment.
Figure 14A:
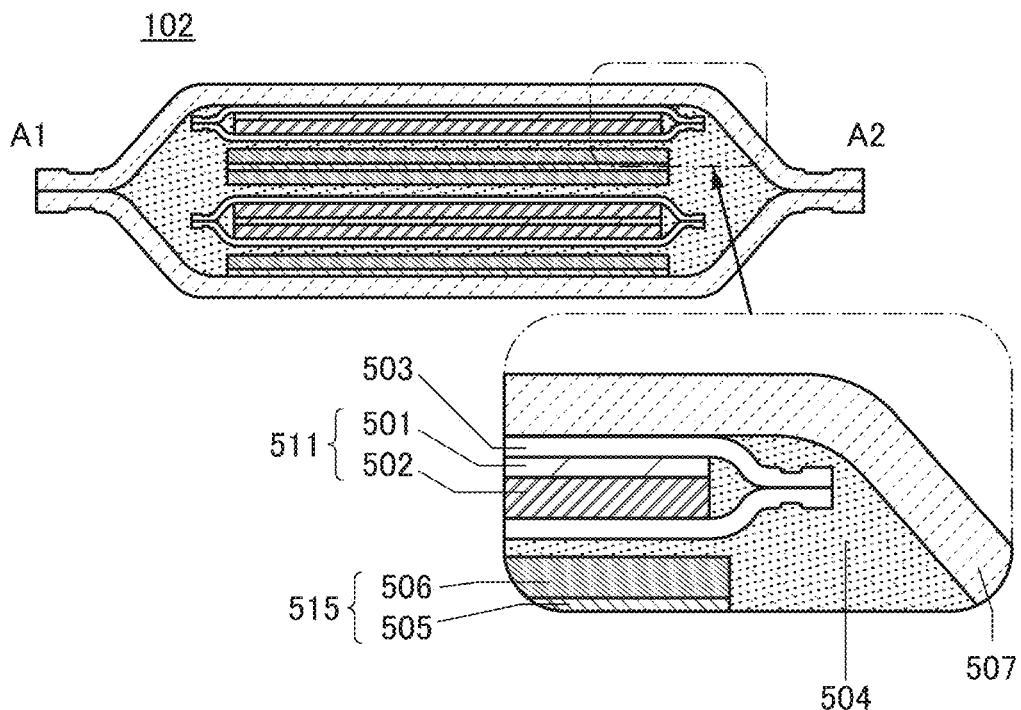
FIGS. 14A and 14B illustrate a method for manufacturing a secondary battery of an embodiment.
Figure 14B:
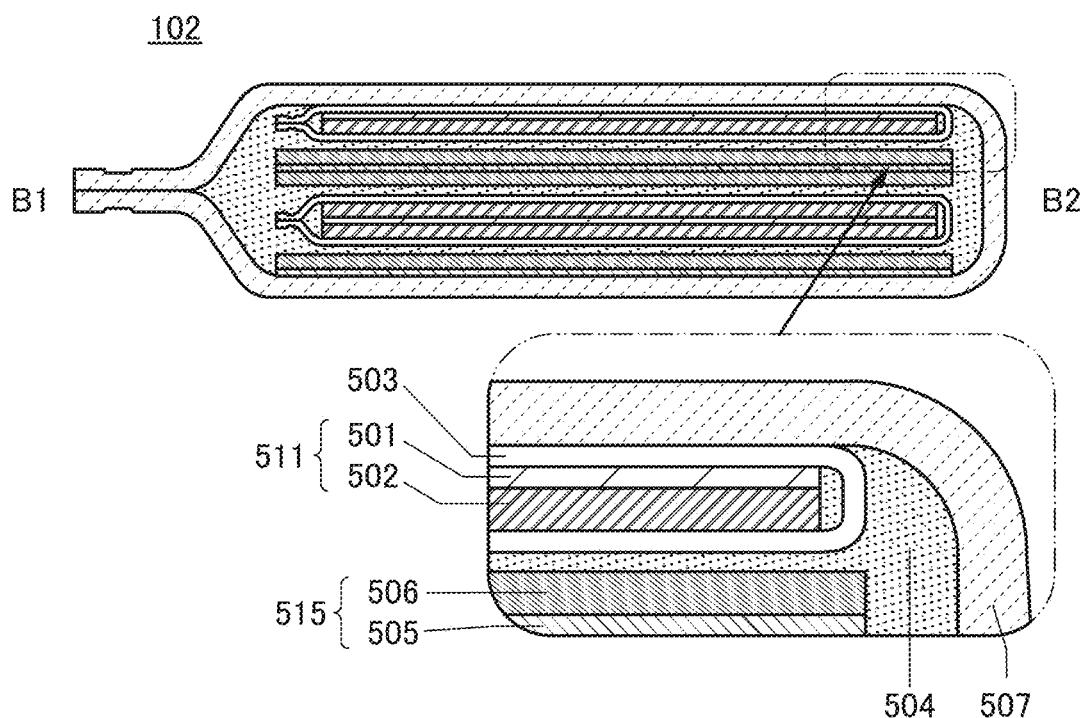

FIG. 13 is a perspective view showing an appearance of the secondary battery 102. FIG. 14A is a cross-sectional view taken along dashed-dotted line A1-A2 in FIG. 13. FIG. 14B is a cross-sectional view taken along dashed-dotted line B1-B2 in FIG. 13.

The secondary battery 102 of one embodiment of the present invention includes, in an exterior body 507, a positive electrode 511 covered with a separator 503, a negative electrode 515, and an electrolyte solution 504. In the example in FIG. 13 and FIGS. 14A and 14B, the secondary battery includes one positive electrode including a positive electrode active material layer 502 on one side of a positive electrode current collector 501, one positive electrode including the positive electrode active material layer 502 on each side of the positive electrode current collector 501, one negative electrode including a negative electrode active material layer 506 on one side of a negative electrode current collector 505, and one negative electrode including the negative electrode active material layer 506 on each side of the negative electrode current collector 505. The positive electrode 511 is electrically connected to a positive electrode lead 521. The negative electrode 515 is electrically connected to a negative electrode lead 525. Each of the positive electrode lead 521 and the negative electrode lead 525 is also referred to as a lead electrode or a lead terminal. Parts of the positive electrode lead 521 and the negative electrode lead 525 are positioned outside the exterior body. The secondary battery 102 is charged and discharged through the positive electrode lead 521 and the negative electrode lead 525.

Note that although FIGS. 14A and 14B illustrate the example in which the positive electrode 511 is covered with the separator 503, one embodiment of the present invention is not limited thereto. The positive electrode 511 is not necessarily covered with the separator 503, for example. The negative electrode 515, instead of the positive electrode 511, may be covered with the separator 503, for example.

(Positive Electrode)

The positive electrode 511 includes, for example, the positive electrode current collector 501 and the positive electrode active material layer 502 formed over the positive electrode current collector 501. Although FIGS. 14A and 14B illustrate the example of one positive electrode 511 including the positive electrode active material layer 502 on only one side of the positive electrode current collector 501 with a sheet shape (or a band-like shape) and one positive electrode 511 including the positive electrode active material layer 502 on each side of the positive electrode current collector 501, one embodiment of the present invention is not limited thereto. Only the positive electrodes 511 each including the positive electrode active material layer 502 on only one side of the positive electrode current collector 501 may be used. Only the positive electrodes 511 each including the positive electrode active material layer 502 on each side of the positive electrode current collector 501 may be used. The use of the positive electrodes 511 including the positive electrode active material layer 502 on each side of the positive electrode current collector 501 allows the secondary battery 102 to have high capacity. In addition, the secondary battery 102 may include three or more positive electrodes 511. An increase in the number of the positive electrodes 511 in the secondary battery 102 can increase the capacity of the secondary battery 102.

The positive electrode current collector 501 can be formed using a material that has high conductivity and does not dissolve at the potential of the positive electrode, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon are zirconium, titanium, hafnium, vanadium, niobium, tantalum, chromium, molybdenum, tungsten, cobalt, nickel, and the like. The positive electrode current collector 501 can have a foil-like shape, a plate-like shape (a sheet-like shape), a net-like shape, a punching-metal shape, an expanded-metal shape, or the like as appropriate. The positive electrode current collector 501 preferably has a thickness of greater than or equal to 5 μm and less than or equal to 30 μm. The surface of the positive electrode current collector 501 may be provided with an undercoat layer using graphite or the like.

The positive electrode active material layer 502 may further include, in addition to a positive electrode active material, a binder for increasing adhesion of the positive electrode active material, a conductive additive for increasing the conductivity of the positive electrode active material layer 502, and the like.

Examples of the positive electrode active material that can be used for the positive electrode active material layer 502 include a composite oxide with an olivine crystal structure, a composite oxide with a layered rock-salt crystal structure, and a composite oxide with a spinel crystal structure. For example, a compound such as $LiFeO_2$, $LiCoO_2$, $LiNiO_2$, $LiMn_2O_4$, $V_2O_5$, $Cr_2O_5$, or $MnO_2$ can be used as the positive electrode active material.

In particular, $LiCoO_2$ is preferable because it has high capacity and higher stability in the air and higher thermal stability than $LiNiO_2$, for example.

It is preferable to add a small amount of lithium nickel oxide ($LiNiO_2$ or $LiNi_{1-x}M_xO_2$ ($0<x<1$) (M=Co, Al, or the like)) to a lithium-containing material with a spinel crystal structure which contains manganese such as $LiMn_2O_4$ because characteristics of the secondary battery using such a material can be improved.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq 1, 0<c<1$, $0<d<1$, and $0<e<1$), and $LiFe_fNi_gCo_hMn_iPO_4$ ($f+g+h+i\leq 1$, $0<f<1$, $0<g<1$, $0<h<1$, and $0<i<1$).

$LiFePO_4$ is particularly preferable because it meets requirements for the positive electrode active material in a balanced manner, such as safety, stability, high capacity density, and the existence of lithium ions that can be extracted in initial oxidation (charging).

Alternatively, a complex material such as $Li_{(2-j)}MSiO_4$ (general formula) (M is one or more of Fe(II), Mn(II), Co(II), and Ni(II); $0\leq j\leq 2$) can be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\leq 1$, $0<m<1$, $0<n<1$, and $0<q<1$), and $Li_{(2-j)}Fe_rNi_sCo_tMn_uSiO_4$ ($r+s+t+u\leq 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material. For example, the positive electrode active material may be a layered oxide containing sodium such as $NaFeO_2$ or $Na_{2/3}[Fe_{1/2}Mn_{1/2}]O_2$.

Further alternatively, any of the above materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not illustrated, a conductive material such as a carbon layer may be provided on a surface of the positive electrode active material layer 502. With the conductive material such as the carbon layer, conductivity of the electrode can be increased. For example, the positive electrode active material layer 502 can be coated with the carbon layer by mixing a carbohydrate such as glucose at the time of baking the positive electrode active material.

The average particle diameter of the primary particle of the positive electrode active material layer 502 is preferably greater than or equal to 50 nm and less than or equal to 100 μm.

Examples of the conductive additive include acetylene black (AB), graphite (black lead) particles, carbon nanotubes, graphene, and fullerene.

A network for electron conduction can be formed in the positive electrode 511 by the conductive additive. The conductive additive also allows maintaining of a path for electric conduction between the particles of the positive electrode active material layer 502. The addition of the conductive additive to the positive electrode active material layer 502 increases the electron conductivity of the positive electrode active material layer 502.

As the binder, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

A favorable range of the content of the binder in the positive electrode active material layer 502 may be determined as appropriate in accordance with the particle diameter of the active material, and can be preferably greater than or equal to 1 wt % and less than or equal to 10 wt %. For example, the favorable range can be greater than or equal to 2 wt % and less than or equal to 8 wt % or greater than or equal to 3 wt % and less than or equal to 5 wt %. The content of the conductive additive in the positive electrode active material layer 502 is preferably greater than or equal to 1 wt % and less than or equal to 10 wt %, further preferably greater than or equal to 1 wt % and less than or equal to 5 wt %.

In the case where the positive electrode active material layer 502 is formed by a coating method, the positive electrode active material, the binder, and the conductive additive are mixed to form a positive electrode paste (slurry), and the positive electrode paste is applied to the positive electrode current collector 501 and dried.

(Negative Electrode)

The negative electrode 515 includes, for example, the negative electrode current collector 505 and the negative electrode active material layer 506 formed over the negative electrode current collector 505. Although FIGS. 14A and 14B illustrate the example of one negative electrode 515 including the negative electrode active material layer 506 on only one side of the negative electrode current collector 505 with a sheet shape (or a band-like shape) and one negative electrode 515 including the negative electrode active material layer 506 on each side of the negative electrode current collector 505, one embodiment of the present invention is not limited thereto. Only the negative electrodes 515 each including the negative electrode active material layer 506 on only one side of the negative electrode current collector 505 may be used. In this case, the sides of the negative electrode current collectors 505, each of which is not provided with the negative electrode active material layer 506, are preferably placed to be in contact with each other because such arrangement can make friction between the contacting sides low to easily relieve stress generated when the secondary battery 102 is curved. Only the negative electrodes 515 each including the negative electrode active material layer 506 on each side of the negative electrode current collector 505 may be used. The use of the negative electrode 515 including the negative electrode active material layer 506 on each side of the negative electrode current collector 505 allows the secondary battery 102 to have high capacity. In addition, the secondary battery 102 may include three or more negative electrodes 515. An increase in the number of the negative electrodes 515 in the secondary battery 102 can increase the capacity of the secondary battery 102.

The negative electrode current collector 505 can be formed using a material that has high conductivity and is not alloyed with a carrier ion of lithium or the like, such as stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 505 can have a foil-like shape, a plate-like shape (a sheet-like shape), a net-like shape, a punching-metal shape, an expanded-metal shape, or the like as appropriate. The negative electrode current collector 505 preferably has a thickness greater than or equal to 5 μm and less than or equal to 30 μm. The surface of the negative electrode current collector 505 may be provided with an undercoat layer using graphite or the like.

The negative electrode active material layer 506 may further include, in addition to a negative electrode active material, a binder for increasing adhesion of the negative electrode active material, a conductive additive for increasing the conductivity of the negative electrode active material layer 506, and the like.

There is no particular limitation on the negative electrode active material as long as it is a material with which lithium can be dissolved and precipitated or a material into/from which lithium ions can be inserted and extracted. Other than a lithium metal or lithium titanate, a carbon-based material generally used in the field of power storage, an alloy-based material, or the like can also be used for the negative electrode active material layer 506.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material or an oxide which enables charge-discharge reaction by an alloying reaction and a dealloying reaction with lithium can be used. In the case where lithium ions are carrier ions, the alloy-based material is, for example, a material containing at least one of Mg, Ca, Al, Si, Ge, Sn, Pb, Sb, Bi, Ag, Au, Zn, Cd, Hg, In, and the like. Such elements have higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), or molybdenum oxide ($MoO_2$) can be used.

Still alternatively, for the negative electrode active material, $Li_{3-x}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material that does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the negative electrode active material layer 506 is formed by a coating method, the negative electrode active material and the binder are mixed to form a negative electrode paste (slurry), and the negative electrode paste is applied to the negative electrode current collector 505 and dried. Note that a conductive additive may be added to the negative electrode paste.

Graphene may be formed on a surface of the negative electrode active material layer 506. In the case of using silicon as the negative electrode active material, the volume of silicon is greatly changed due to occlusion and release of carrier ions in charge-discharge cycles. Therefore, adhesion between the negative electrode current collector 505 and the negative electrode active material layer 506 is decreased, resulting in degradation of battery characteristics caused by charge and discharge. Thus, graphene is preferably formed on a surface of the negative electrode active material layer 506 containing silicon because even when the volume of silicon is changed in charge-discharge cycles, decrease in the adhesion between the negative electrode current collector 505 and the negative electrode active material layer 506 can be inhibited, which makes it possible to reduce degradation of battery characteristics.

Alternatively, a coating film of an oxide or the like may be formed on the surface of the negative electrode active material layer 506. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 506 in advance can reduce or prevent generation of irreversible capacity.

As the coating film coating the negative electrode active material layer 506, an oxide film of any one of niobium, titanium, vanadium, tantalum, tungsten, zirconium, molybdenum, hafnium, chromium, aluminum, and silicon or an oxide film containing any one of these elements and lithium can be used. Such a coating film is denser than a conventional coating film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 506 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 506. A decrease in the capacity of the power storage unit can be prevented by using the coating film.

(Separator)

As a material of the separator 503, a porous insulator such as cellulose, polypropylene (PP), polyethylene (PE), polybutene, nylon, polyester, polysulfone, polyacrylonitrile, polyvinylidene fluoride, tetrafluoroethylene, or polyphenylene sulfide can be used. Alternatively, nonwoven fabric of a glass fiber or the like, or a diaphragm in which a glass fiber and a polymer fiber are mixed may be used.

(Electrolyte Solution)

As an electrolyte in the electrolyte solution 504, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, $Li(C_2F_5SO_2)_2N$, and $Li(SO_2F)_2N$. One of these electrolytes may be used alone, or two or more of them may be used in an appropriate combination and in an appropriate ratio.

It is particularly preferable that the electrolyte have high heat resistance in the case where treatment is performed at high temperature in molding rubber or the like. It is preferable to use imide salt having high thermal decomposition temperature, for example.

As a solvent of the electrolyte solution 504, a material having carrier ion mobility is used. As the solvent of the electrolyte solution, an aprotic organic solvent is preferably used. Typical examples of aprotic organic solvents include ethylene carbonate (EC), propylene carbonate (PC), dimethyl carbonate, diethyl carbonate (DEC), ethylmethyl carbonate (EMC), γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolytic solution, for example, safety against liquid leakage and the like is improved. Furthermore, the secondary battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more kinds of ionic liquids (room temperature molten salts) which have features of non-flammability and non-volatility as the solvent of the electrolyte solution can prevent the secondary battery from exploding or catching fire even when the secondary battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

It is particularly preferable to use a material having high boiling temperature as the solvent of the electrolyte solution in the case where treatment is performed at high temperature in molding rubber or the like. It is preferable to use propylene carbonate (PC), for example.

(Exterior Body)

There are a variety of structures of a secondary battery, and a film is used for formation of the exterior body 507 in this embodiment. Note that the film used for the exterior body 507 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming depressions or projections on a surface of a metal film by embossing increases the surface area of the exterior body 507 exposed to outside air, achieving efficient heat dissipation.

In the case where the secondary battery 102 is changed in form by externally applying force, bending stress is externally applied to the exterior body 507 of the secondary battery 102. This might partly deform or damage the exterior body 507. Projections or depressions formed on the exterior body 507 can relieve a strain caused by stress applied to the exterior body 507. Therefore, the secondary battery 102 can be more reliable. Note that a "strain" is the scale of change in form indicating the displacement of a point of an object relative to the reference (initial) length of the object. The exterior body 507 having depressions or projections can reduce the influence of a strain caused by application of external force to the secondary battery to an acceptable level. Thus, the secondary battery having high reliability can be provided.

The above is the description of the structure example.

Fabricating Method Example

An example of a fabricating method of the secondary battery 102 is described below.

(Preparing Positive Electrode and Covering it With Separator)

Figure 15A:
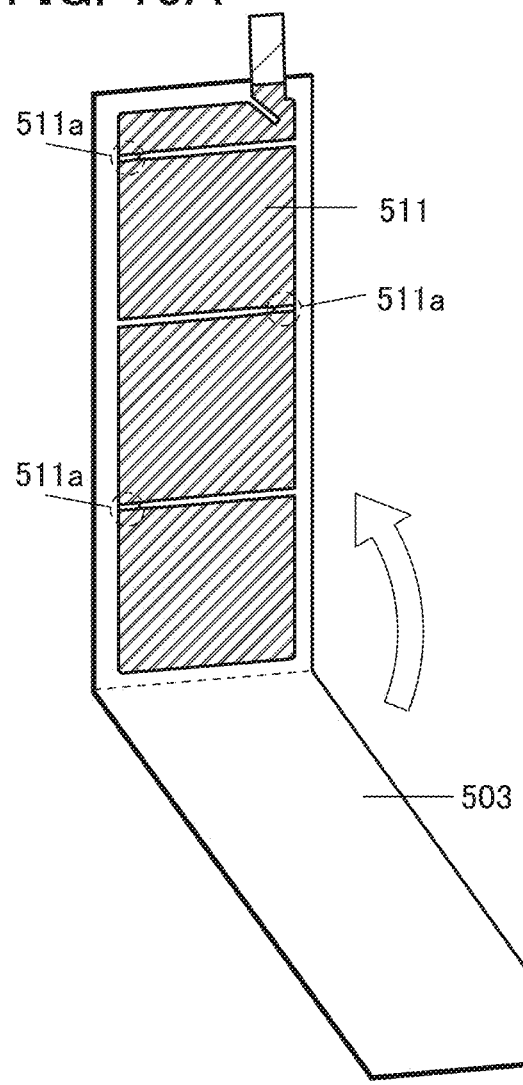
FIGS. 15A to 15C illustrate a method for fabricating a secondary battery of an embodiment.

First, the positive electrode 511 including the positive electrode active material layer 502 is placed on the separator 503 (see FIG. 15A). FIG. 15A illustrates an example where the positive electrode active material layer 502 is provided on each side of the positive electrode current collector 501 having a meandering shape in which slits are formed.

The slit formed in the positive electrode current collectors 501 can suppress the difference between the positions of end portions of the plurality of current collectors when the secondary battery 102 is curved. The slit can also relieve tension applied to the current collector far from the curvature center.

Furthermore, there is no positive electrode active material layer 502 in a region 511a, which overlaps with a slit of the negative electrode 515 when the positive electrode 511 and the negative electrode 515 are stacked in a later step. If the positive electrode active material layer 502 is present in the region 511a, where the positive electrode 511 overlaps with the slit of the negative electrode 515, there is no negative electrode active material layer 506 in a region overlapping with this positive electrode active material layer 502, which might cause a problem in a battery reaction. Specifically, this might concentrate carrier ions released from the positive electrode active material layer 502 in the negative electrode active material layer 506 in the region closest to the slit, so that the carrier ions might be deposited on the negative electrode active material layer 506. Thus, the deposition of the carrier ions on the negative electrode active material layer 506 can be suppressed when there is no positive electrode active material layer 502 in the region 511a, which overlaps with the slit of the negative electrode 515.

Then, the separator 503 is folded along the dotted line in FIG. 15A so that the positive electrode 511 is interposed between facing parts of the separator 503. Next, the outer edges of the separator 503, which is outside of the positive electrode 511, are bonded to form the bag-like separator 503 (see FIG. 15B). The bonding of the outer edges of the separator 503 can be performed with the use of an adhesive or the like, by ultrasonic welding, or by thermal fusion bonding.

Figure 15B:
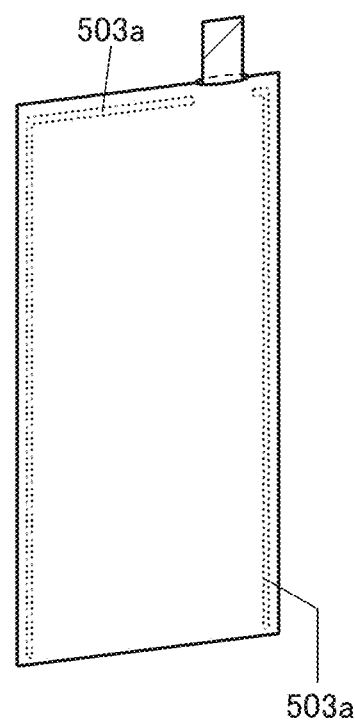

In this embodiment, polypropylene is used as the separator 503, and the outer edges of the separator 503 are bonded to each other by heating. Bonding portions 503a are illustrated in FIG. 15B. In such a manner, the positive electrode 511 can be covered with the separator 503. The separator 503 is formed so as to cover the positive electrode active material layer 502 and does not necessarily cover the whole positive electrode 511.

Note that although FIGS. 15A and 15B illustrate the example in which the separator 503 is folded, one embodiment of the present invention is not limited thereto. For example, the positive electrode 511 may be interposed between two separators. In that case, the bonding portion 503a may be formed to surround almost all of the four sides of the positive electrode 511.

The outer edges of the separator 503 may be bonded intermittently or may be bonded at dot-like bonding portions provided at regular intervals.

Alternatively, bonding may be performed along only one side of the outer edges. Alternatively, bonding may be performed along only two sides of the outer edges. Alternatively, bonding may be performed along four sides of the outer edges; accordingly, the four sides can be in an even state.

Note that although the case where the positive electrode 511 is covered with the separator 503 is shown in FIGS. 15A and 15B, and the like, one embodiment of the present invention is not limited thereto. The positive electrode 511 is not necessarily covered with the separator 503, for example. The negative electrode 515, instead of the positive electrode 511, may be covered with the separator 503, for example.

(Preparing Negative Electrode)

Figure 15C:
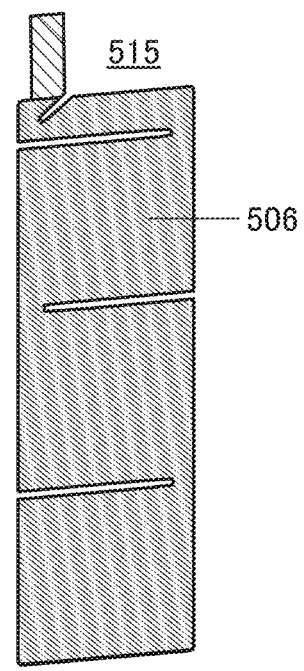

Next, the negative electrode 515 is prepared (see FIG. 15C). FIG. 15C illustrates an example where the negative electrode active material layer 506 is provided on each side of the negative electrode current collector 505 having a meandering shape in which slits are formed.

The slit formed in the negative electrode current collectors 505 can suppress the difference between the positions of end portions of the plurality of current collectors when the secondary battery 102 is curved. The slit can also relieve tension applied to the current collector far from the curvature center.

(Making Positive Electrodes and Negative Electrodes Overlap with Each Other and Connecting Leads)

Figure 16A:
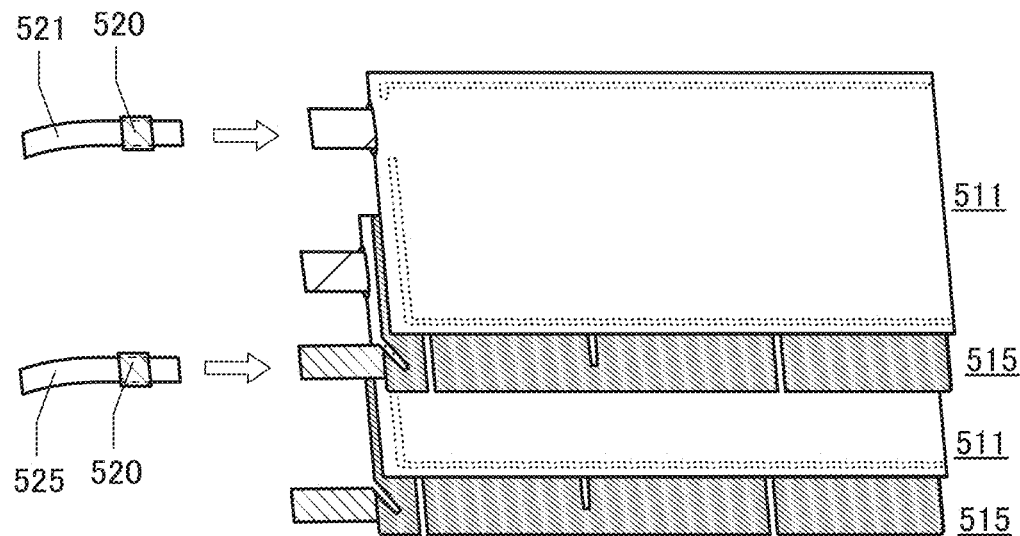
FIGS. 16A and 16B illustrate a method for fabricating a secondary battery of an embodiment.

Next, the positive electrodes 511 and the negative electrodes 515 are stacked (see FIG. 16A). This embodiment shows an example in which two positive electrodes 511 and two negative electrodes 515 are used.

Next, the positive electrode lead 521 including a sealing layer 520 is electrically connected to positive electrode tabs of the plurality of positive electrode current collectors 501 by ultrasonic wave irradiation with pressure applied (ultrasonic welding). Alternatively, welding using a laser may be performed.

The lead is likely to be cracked or cut by stress due to external force applied after fabrication of the secondary battery 102.

Figure 16B:
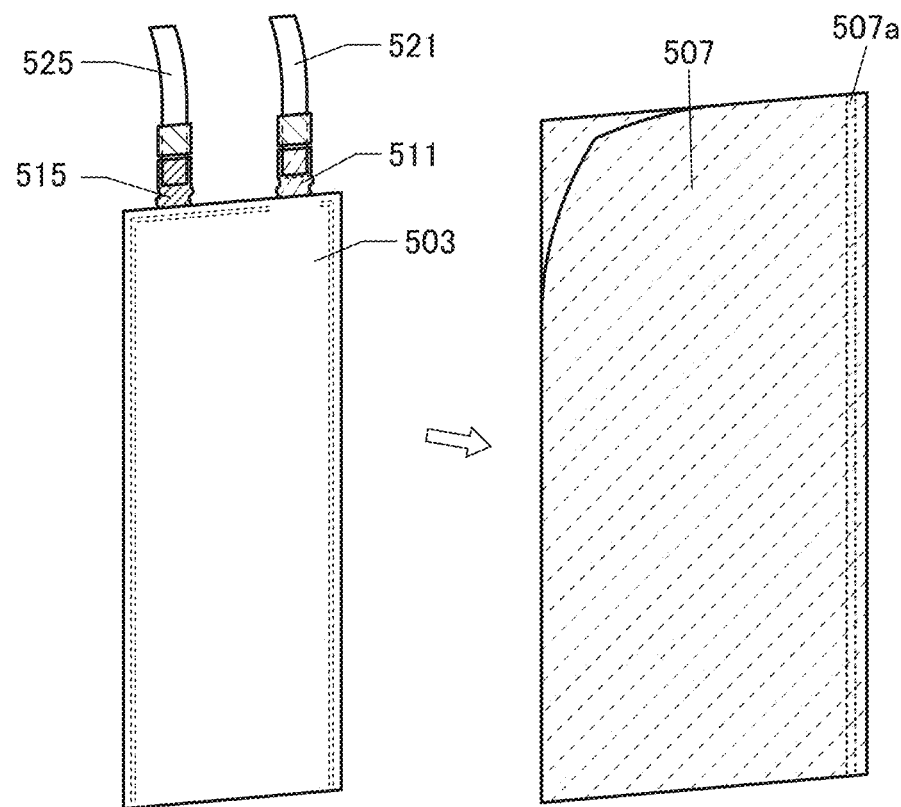

When the positive electrode lead 521 is subjected to ultrasonic welding, a connection region and a curved portion can be formed in the positive electrode tab (FIG. 16B).

This curved portion can relieve stress due to external force applied after fabrication of the secondary battery 102. Therefore, the secondary battery 102 can be more reliable.

The curved portion is not necessarily formed in the positive electrode tab. The positive electrode current collector may be formed using a high-strength material such as stainless steel to a thickness of 10 μm or less, in order to easily relieve stress due to external force applied after fabrication of a secondary battery.

It is needless to say that two or more of the above examples may be combined to relieve concentration of stress in the positive electrode tab.

Then, in a manner similar to that of the positive electrode current collector 501, the negative electrode lead 525 including the sealing layer 520 is electrically connected to the negative electrode tab of the negative electrode current collector 505 by ultrasonic welding.

(Preparing Exterior Body and Covering Positive Electrodes and Negative Electrodes)

A film used as an exterior body is folded, and thermocompression bonding is performed along one side of the folded exterior body. A portion where thermocompression bonding is performed along one side of the folded exterior body 507 is shown as a bonding portion 507a in FIG. 16B. With the exterior body 507 thus obtained, the positive electrodes 511 and the negative electrodes 515 are covered.

(Injecting Electrolyte Solution)

Figure 17A:
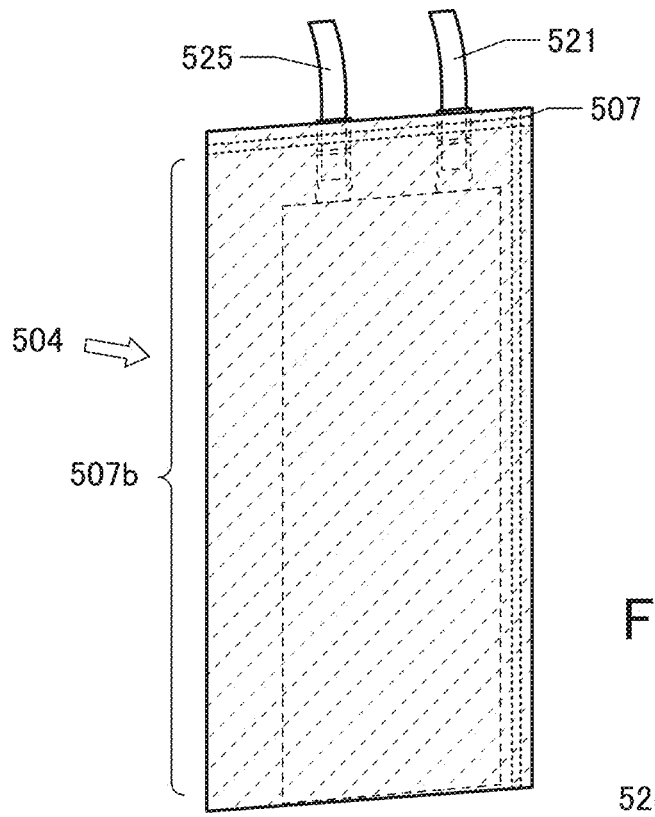
FIGS. 17A and 17B illustrate a structure example of a secondary battery and its fabrication method of an embodiment.

Next, thermocompression bonding is also performed in a manner similar to the above along one side of the exterior body 507, which overlaps with the sealing layer 520 provided on the positive electrode lead 521 and the sealing layer 520 provided on the negative electrode lead 525 (FIG. 17A). After that, the electrolyte solution 504 is injected from an unsealed side 507b of the exterior body 507, which is illustrated in FIG. 17A, into a region covered with the exterior body 507.

Figure 17B:
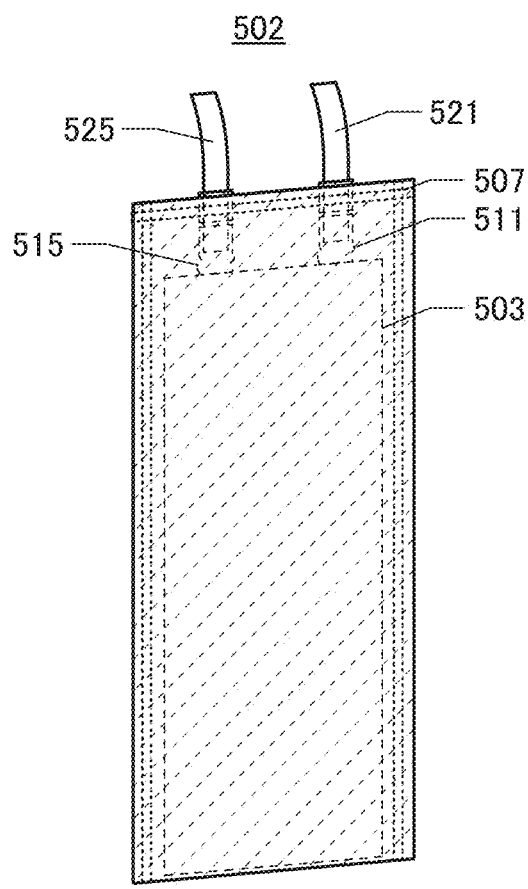

Then, the remaining open side (the side 507b) of the exterior body 507 is sealed under vacuum, heating, and pressing, whereby the secondary battery 102 can be formed (FIG. 17B). Injecting the electrolyte solution and sealing are performed in an environment from which an impurity such as oxygen, water, or nitrogen is eliminated, for example, in a glove box. The evacuation to a vacuum is preferably performed with a vacuum sealer, a liquid pouring sealer, or the like. Heating and pressing can be performed for the unsealed side 507b placed between two heatable bars included in the sealer. An example of the conditions is as follows: the degree of vacuum is 40 kPa, the heating temperature is 190° C., the pressure is 0.1 MPa, and the time is 3 seconds. Here, the side 507b may be sealed while pressing part of the exterior body 507 where a positive electrode and a negative electrode are positioned. By the pressure application, bubbles which enter between the positive electrode and the negative electrode when the electrolyte solution is injected can be removed.

Modification Example

Figure 18A:
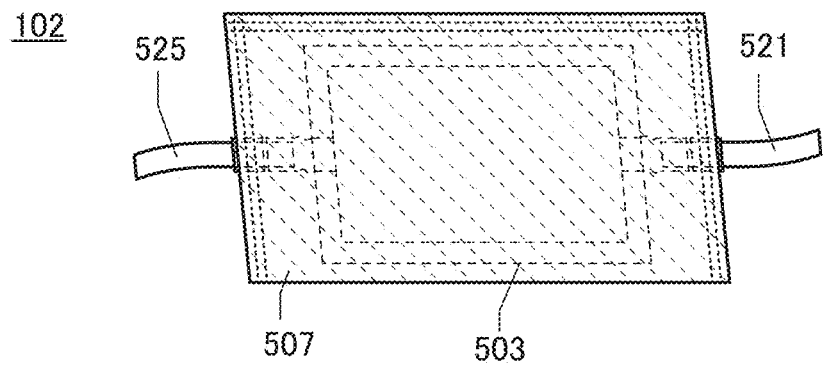
FIGS. 18A and 18B illustrate a method for fabricating a secondary battery of an embodiment.
Figure 18B:
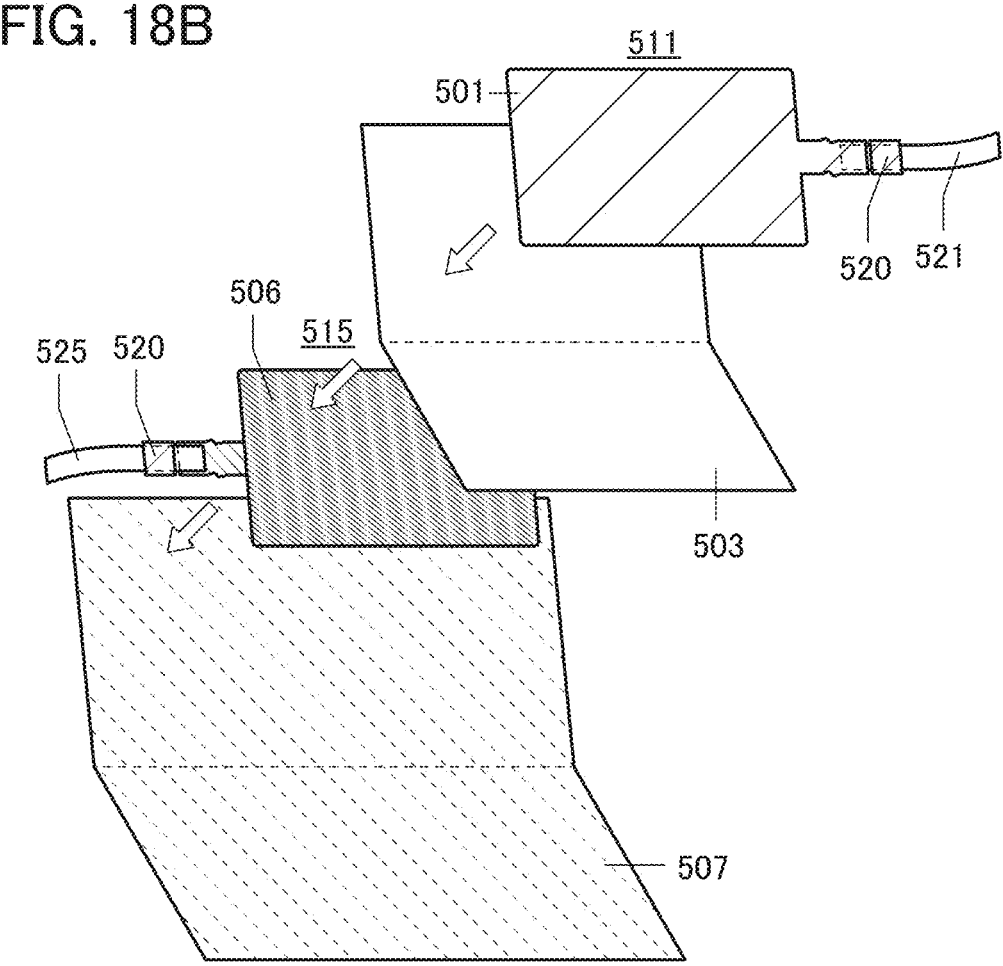

FIG. 18A illustrates a modification example of the secondary battery 102. The secondary battery 102 illustrated in FIG. 18A is different from the secondary battery 102 shown in FIGS. 16A and 16B in the arrangement of the positive electrode lead 521 and the negative electrode lead 525. Specifically, the positive electrode lead 521 and the negative electrode lead 525 in the secondary battery 102 in FIGS. 16A and 16B are provided on the same side of the exterior body 507, whereas the positive electrode lead 521 and the negative electrode lead 525 in the secondary battery 102 in FIGS. 18A and 18B are provided on different sides of the exterior body 507. Thus, the leads of the secondary battery of one embodiment of the present invention can be freely positioned, and accordingly the degree of freedom in design is high. Accordingly, a product including the secondary battery of one embodiment of the present invention can have a higher degree of freedom in design. Furthermore, the yield of products each including the secondary battery of one embodiment of the present invention can be increased.

FIG. 18B illustrates a fabrication process of the secondary battery 102 in FIG. 18A. The fabricating method of the secondary battery 102 in FIG. 13 can be referred to for the details. Note that in FIG. 18B, the electrolyte solution 504 is not illustrated.

Pressing (e.g., embossing) may be performed to form unevenness in advance on a surface of a film used as the exterior body 507. The unevenness on the surface of the film increases flexibility of a secondary battery and further relieves stress. The depressions or projections of a surface (or a rear surface) of the film formed by embossing form an obstructed space that is sealed by the film serving as a part of a wall of the sealing structure and whose inner volume is variable. It can be said that the depressions or projections of the film form an accordion structure (bellows structure) in this obstructed space. Note that embossing, which is a kind of pressing, is not necessarily employed and any method that allows formation of a relief on part of the film is employed.

Note that one embodiment of the present invention is not limited thereto. Various embodiments of the invention are described in this embodiment and the other embodiment, and one embodiment of the present invention is not limited to a particular embodiment. For example, although an example of use of one embodiment of the present invention in a lithium-ion secondary battery is described, one embodiment of the present invention is not limited thereto. One embodiment of the present invention can be used for a variety of secondary batteries, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor or a lithium ion capacitor, and the like. One embodiment of the present invention is not necessarily used for a lithium-ion secondary battery.

The above is the description of the fabricating method example.

At least part of this embodiment can be implemented in combination with any of the other embodiments described in this specification as appropriate.

Embodiment 3

In this embodiment, a structure example of a battery suitable for application of being bent and unbent repeatedly is described.

Figure 19A:
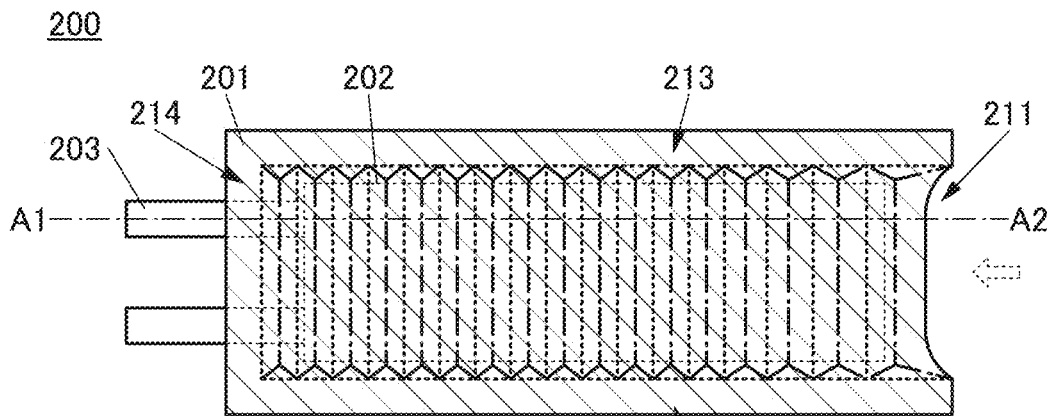
FIGS. 19A to 19D illustrate a structure example of a battery of an embodiment.
Figure 19B:
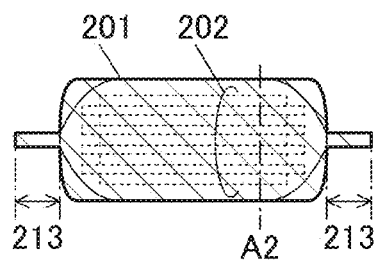
Figure 19C:
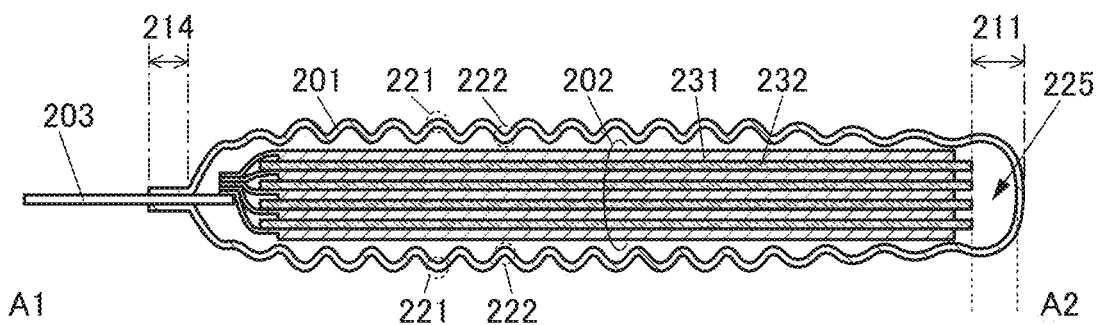

FIG. 19A is a schematic top view of a battery 200. FIG. 19B is a schematic view of the battery 200 when seen from a direction of a dashed arrow in FIG. 19A. FIG. 19C is a schematic cross-sectional view taken along line A1-A2 in FIG. 19A.

The battery 200 includes an exterior body 201, a stack 202 in the exterior body 201, and tabs 203 electrically connected to the stack 202 and extending outside the exterior body 201. In the area surrounded by the exterior body 201, an electrolyte solution is provided in addition to the stack 202.

The exterior body 201 has a film-like shape and is folded in half with the stack 202 between facing portions of the exterior body. The exterior body 201 includes a folded portion 211, a pair of bonding portions 213, and a bonding portion 214. The pair of bonding portions 213 can each also be referred to as the side sealing portion. The bonding portion 214 is positioned on the tab 203 side and can also be referred to as the top sealing portion.

Part of the exterior body 201 which overlaps with the stack 202 preferably has a wave shape in which crest lines 221 and trough lines 222 are alternately arranged. The bonding portions 213 and 214 of the exterior body 201 are preferably flat.

The stack 202 has a structure in which electrodes 231 and electrodes 232 are alternately stacked. For example, the electrodes 231 each serve as one of a positive electrode and a negative electrode, and the electrodes 232 each serve as the other thereof. Although not illustrated, a separator may be provided between the electrode 231 and the electrode 232.

As illustrated in FIG. 19C, in the folded portion 211, a space 225 is preferably provided between the exterior body 201 and the stack 202.

Figure 19D:
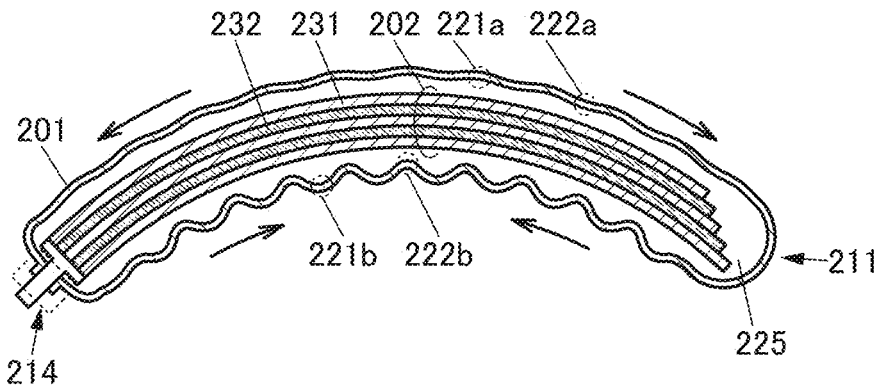

FIG. 19D is a schematic cross-sectional view of the bent battery 200. Note that in FIG. 19D, some components are not illustrated.

When the battery 200 is bent, part of the exterior body 201 positioned on the outer side in bending is unbent and the other part positioned on the inner side changes its shape as it shrinks. More specifically, the part of the exterior body 201 positioned on the outer side in bending changes its shape such that the wave amplitude becomes smaller and the length of the wave period becomes larger. In contrast, the part of the exterior body 201 positioned on the inner side in bending changes its shape such that the wave amplitude becomes larger and the length of the wave period becomes smaller. When the exterior body 201 changes its shape in this manner, stress applied to the exterior body 201 due to bending is relieved, so that the exterior body 201 itself does not need to expand and contract. As a result, the battery 200 can be bent by weak force without damage to the exterior body 201.

As illustrated in FIG. 19D, the stack 202 changes its shape such that the relative positions of the electrodes 231 and the electrodes 232 are shifted. Here, the plurality of electrodes 231 and 232 in the stack 202 are fixed on the bonding portion 214 side and thus changes their shapes such that the relative positions of the electrodes 231 and the electrodes 232 are more shifted at a position closer to the folded portion 211. Thus, the stress applied to the stack 202 is relieved, so that the electrodes 231 and 232 themselves do not need to expand and contract. As a result, the battery 200 can be bent without damage to the stack 202.

Note that in the case of using a solid electrolyte or a gel electrolyte, when the entire stack 202 is covered with the electrolyte, the relative positions of the electrodes 231 and the electrodes 232 are less likely to be shifted, and therefore, relief of stress cannot be expected. Therefore, a plurality of stacks each including an electrolyte layer between the pair of electrodes 231 and 232 are preferably prepared and stacked. Thus, a structure can be obtained in which the relative positions of the electrodes 231 and 232 are shifted even in the case of using a solid electrolyte or a gel electrolyte.

Furthermore, when a space 225 is provided between the stack 202 and the exterior body 201, the relative positions of the electrodes 231 and 232 located inward from a neutral plane of the exterior body 201 can be shifted without being in contact with the exterior body 201.

In the battery exemplified in this embodiment, for example, the exterior body and the stack are less likely to be damaged and the battery characteristics are less likely to deteriorate even when the battery is repeatedly bent and unbent.

At least part of this embodiment can be implemented in combination with any of the other embodiments described in this specification as appropriate.

Example

A battery module was manufactured by the manufacturing method of one embodiment of the present invention. Here, the method exemplified in Modification Example 1 in Embodiment 1 (see FIGS. 3A to 3E) was used.

First, a lithium-ion secondary battery was prepared. The lithium-ion secondary battery was fabricated using $LiCoO_2$ as a positive electrode active material, graphite as a negative electrode active material, and an embossed aluminum laminated film as an exterior body. An aluminum foil was used for a positive electrode current collector, and a positive electrode active material layer was applied onto one surface thereof. A copper foil was used for a negative electrode current collector, and a negative electrode active material layer was applied onto one surface thereof. A surface opposite to the applied surface of the positive electrode current collector is provided in contact with that of another positive electrode current collector. These positive electrode current collectors are sandwiched by a cellulose separator, and the cellulose separator was molded into a bag-like shape. The molding was performed in such a manner that polypropylene was sandwiched between portions of the cellulose separator which overlap with each other and subjected to thermocompression bonding. Similarly, a surface opposite to the applied surface of the negative electrode current collector is provided in contact with that of another negative electrode current collector. Then, six positive electrode current collectors and six negative electrode current collectors were stacked such that the applied surface of the positive electrode current collector faces the applied surface of the negative electrode current collectors, whereby an electrode stack was obtained. An aluminum laminated film is folded in half so as to sandwich the electrode stack, and three sides were bonded. Bonding for formation of a bonding portion of the film was performed using a mold (heat bar). A heat bar with a flat surface was used for a side sealing portion, and a heat bar having a depression in part of a surface overlapping with a tab was used for a top sealing portion.

As the exterior body, an aluminum laminated film with a thickness of approximately 50 μm in which polypropylene, aluminum foil, and nylon are stacked in this order was used. A wavelike film embossed so that the wave pitch was 2 mm and the height difference between a crest and a trough was 0.5 mm was used as the aluminum laminated film.

First, a first molding was performed to form a rubber molded body (the first portion) including a depression into which the lithium-ion secondary battery was inserted. In the first molding, a millable fluorine rubber was used as a material to be molded. The molding was performed using a pressing cylinder having a diameter of 260 mm for 10 minutes under conditions where the temperature was 170° C. and the presser was 200 kgf/cm².

Next, the lithium-ion secondary battery was inserted into the depression of the rubber molded body (the first portion).

Next, the rubber molded body and the lithium-ion secondary battery were provided in a metallic mold (a second mold) and subjected to second molding, so that the second portion was formed. The material in the first molding was used as a material to be molded. The second molding was performed using a pressing cylinder having a diameter of 260 mm for 10 minutes under conditions where the temperature was 160° C. and the presser was 30 kgf/cm².

Through the above process, the battery module including the lithium-ion secondary battery in the rubber molded body was obtained.

Since the exterior body is molded in two steps (by first molding and second molding) in one embodiment of the present invention, the temperature and the pressure can be made sufficiently high in the first molding. Therefore, the degree of freedom in conditions for molding the first portion which is a main portion of the exterior body is high, and thus formation under optimized conditions is possible. As a result, the exterior body can have better appearance and higher strength. Since the second portion can be formed in contact with only the vicinity of the top sealing portion of the secondary battery in the second molding, the pressure for the molding can be made relatively high. Thus, defective bonding or the like can be prevented.

Figure 20A:
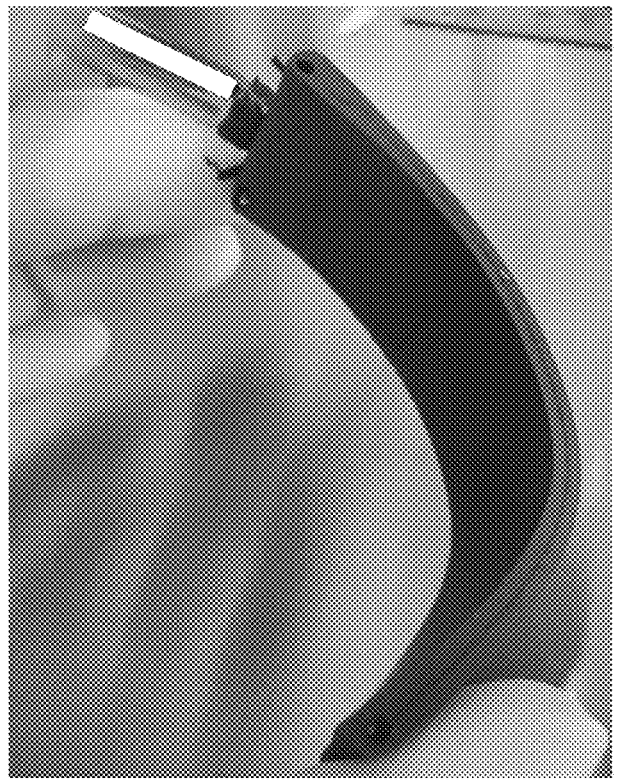
FIGS. 20A and 20B are photographs of a battery module of an embodiment.

FIG. 20A is a photograph of the fabricated battery module. As shown in the photograph, the battery module can be bent easily by weak force.

Figure 20B:
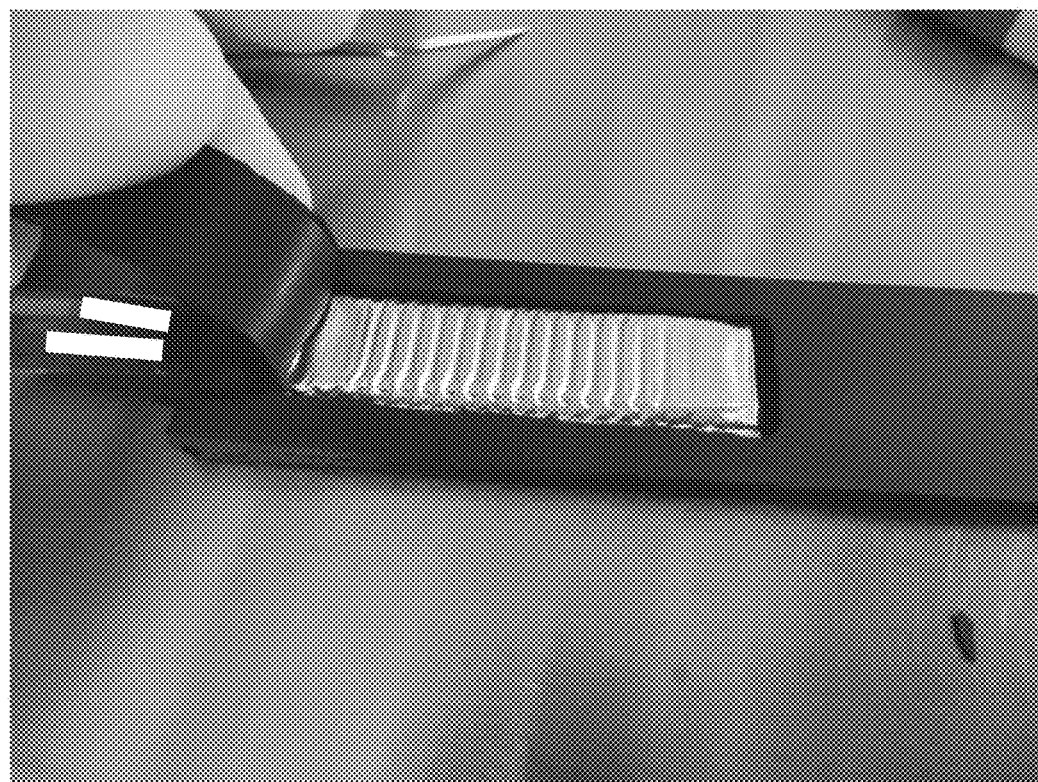

FIG. 20B shows a state in which part of the exterior body is cut to expose the secondary battery. Thus, it is confirmed that the exterior body of the secondary battery is not damaged and keeps the shape.

The above is the description of this example.

Note that this example can be implemented in combination with any of the other embodiments described in this specification as appropriate.

EXPLANATION OF REFERENCE

10: battery module, 20: exterior body, 21: first portion, 21*a*: slit, 21*b*: slit, 21*c*: slit, 22: second portion, 23: depression, 24: opening edge, 25: space, 26*a*: hole, 26*b*: hole, 30: battery, 30*a*: battery, 31: exterior body, 32: tab, 33: circuit board, 34: FPC, 35: protection member, 35*a*: plate portion, 35*b*: plate portion, 35*c*: bonding portion, 41*a*: first portion, 41*b*: first portion, 42: second portion, 50*a*: mold, 50*b*: mold, 50*c*: mold, 50*d*: mold, 51*a*: upper mold, 51*b*: lower mold, 52*a*: upper mold, 52*b*: lower mold, 53: core, 54*a*: core, 54*b*: core, 55*a*: injection hole, 55*b*: injection hole, 60: battery module, 61: band portion, 62: band portion, 63: holding portion, 64: operation button, 70: frame, 71: terminal, 72: terminal, 75: case, 80: electronic device, 81: housing, 82: display portion, 83: terminal, 84: terminal, 90: battery module, 91: case, 91*a*: top cover, 91*b*: bottom cover, 92: terminal, 94: depression, 95: first portion, 96: second portion, 97: exterior body, 102: secondary battery, 200: battery, 201: exterior body, 202: stack, 203: tab, 211: folded portion, 213: bonding portion, 214: bonding portion, 221: crest line, 222: trough line, 225: space, 231: electrode, 232: electrode, 501: positive electrode current collector, 502: positive electrode active material layer, 503: separator, 503*a*: bonding portion, 504: electrolyte solution, 505: negative electrode current collector, 506: negative electrode active material layer, 507: exterior body, 507*a*: bonding portion, 507*b*: side, 511: positive electrode, 511*a*: region, 515: negative electrode, 520: sealing layer, 521: positive electrode lead, 525: negative electrode lead.

This application is based on Japanese Patent Application serial no. 2016-080389 filed with Japan Patent Office on Apr. 13, 2016, the entire contents of which are hereby incorporated by reference.

The invention claimed is:

1. A method for manufacturing a battery module comprising the steps of:
    forming a first portion of a first exterior body by molding a first material using a first mold, the first portion having a depression;
    preparing a battery including a second exterior body and a pair of tabs;
    inserting the battery into the depression so that part of the pair of tabs projects outside an opening edge of the depression;
    providing the first portion into which the battery is inserted in a second mold; and
    forming a second portion of the first exterior body by molding a second material using the second mold, thereby forming the first exterior body in which the first portion and the second portion are bonded to each other in the opening edge, wherein the first portion has a shape in which a vicinity of the opening edge is cut out obliquely, wherein the second portion seals the opening edge of the depression, wherein the second portion is in contact with an end portion of the second exterior body and the part of the pair of tabs is exposed at the outside of the second portion, wherein the first material and the second material are rubber, and wherein the second exterior body comprises a portion not bonded to the first portion.

2. The method for manufacturing a battery module according to claim 1, wherein the battery has flexibility.

3. The method for manufacturing a battery module according to claim 1, wherein the first material is the same as the second material.

4. The method for manufacturing a battery module according to claim 1, wherein a millable material is used as the first material and the second material, and wherein the first portion and the second portion are formed by one of direct pressure molding, direct pressure injection molding, and injection molding.

5. The method for manufacturing a battery module according to claim 1, wherein one of a liquid material and a paste-form material is used as the first material and the second material, and wherein the first portion and the second portion are formed by injection molding.

6. The method for manufacturing a battery module according to claim 1, wherein the battery is provided so that at least parts of the pair of tabs overlap with the opening edge and the other parts of the pair of tabs project outside the opening edge.

7. A method for manufacturing a battery module comprising the steps of:

forming a first portion of a first exterior body by molding a first material using a first mold, the first portion having a depression;

preparing a battery including a second exterior body and a pair of electrodes;

inserting the battery into the depression so that part of the pair of electrodes projects outside an opening edge of the depression;

providing the first portion into which the battery is inserted in a second mold; and forming a second portion of the first exterior body by molding a second material using the second mold, thereby forming the first exterior body in which the first portion and the second portion are bonded to each other in the opening edge, wherein the first portion has a shape in which a vicinity of the opening edge is cut out obliquely, wherein the second portion seals the opening edge of the depression, wherein the second portion is in contact with an end portion of the second exterior body and the part of the pair of electrodes is exposed at the outside of the second portion, wherein the first exterior body comprises a first plate and a second plate, wherein the battery is sandwiched by the first plate and the second plate, wherein the first material and the second material are rubber, and wherein the second exterior body comprises a portion not bonded to the first portion.

8. The method for manufacturing a battery module according to claim 7, wherein the first plate and the second plate have different lengths.

9. The method for manufacturing a battery module according to claim 7, wherein the first plate and the second plate are bonded to each other by a bonding portion.

10. The method for manufacturing a battery module according to claim 9, wherein the battery, the first plate, and the second plate are fixed to each other only in a vicinity of the bonding portion.

11. The method for manufacturing a battery module according to claim 7, wherein the battery has flexibility.

12. The method for manufacturing a battery module according to claim 7, wherein the first material is the same as the second material.

13. The method for manufacturing a battery module according to claim 7, wherein a millable material is used as the first material and the second material, and wherein the first portion and the second portion are formed by one of direct pressure molding, direct pressure injection molding, and injection molding.

14. The method for manufacturing a battery module according to claim 7, wherein one of a liquid material and a paste-form material is used as the first material and the second material, and wherein the first portion and the second portion are formed by injection molding.

15. The method for manufacturing a battery module according to claim 7, wherein the battery is provided so that at least parts of the pair of tabs overlap with the opening edge and the other parts of the pair of tabs project outside the opening edge.

16. A method for manufacturing a module comprising the steps of:

forming a first portion of a first exterior body by molding a first material using a first mold, the first portion having a depression;

preparing an electronic component including a second exterior body and at least one electrode;

inserting the electronic component into the depression so that part of the electrode projects outside an opening edge of the depression;

providing the first portion into which the electronic component is inserted in a second mold; and forming a second portion of the first exterior body by molding a second material using the second mold, thereby forming the first exterior body in which the first portion and the second portion are bonded to each other in the opening edge, wherein the first portion has a shape in which a vicinity of the opening edge is cut out obliquely, wherein the second portion seals the opening edge of the depression, wherein the second portion is in contact with an end portion of the second exterior body and the part of the electrode is exposed at the outside of the second portion, wherein the first material and the second material are rubber, and wherein the second exterior body comprises a portion not bonded to the first portion.

17. The method for manufacturing a module according to claim 16, wherein the electronic component has flexibility.

18. The method for manufacturing a module according to claim 16, wherein the first material is the same as the second material.

19. The method for manufacturing a module according to claim 16,
   wherein a millable material is used as the first material and the second material, and
   wherein the first portion and the second portion are formed by one of direct pressure molding, direct pressure injection molding, and injection molding.

20. The method for manufacturing a module according to claim 16,
   wherein one of a liquid material and a paste-form material is used as the first material and the second material, and
   wherein the first portion and the second portion are formed by injection molding.

\* \* \* \* \*